United States Patent
Lee et al.

(10) Patent No.: US 9,256,345 B2
(45) Date of Patent: Feb. 9, 2016

(54) IMAGE DISPLAY APPARATUS AND METHOD FOR OPERATING THE SAME

(75) Inventors: Hongjin Lee, Seoul (KR); Chungha Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 278 days.

(21) Appl. No.: 13/228,198

(22) Filed: Sep. 8, 2011

(65) Prior Publication Data

US 2012/0062457 A1 Mar. 15, 2012

Related U.S. Application Data

(60) Provisional application No. 61/437,670, filed on Jan. 30, 2011.

(30) Foreign Application Priority Data

Sep. 10, 2010 (KR) ........................ 10-2010-0089095

(51) Int. Cl.
| | | |
|---|---|---|
| G06F 3/048 | (2013.01) | |
| G06F 3/0481 | (2013.01) | |
| G06F 3/0346 | (2013.01) | |
| H04N 21/422 | (2011.01) | |
| H04N 21/485 | (2011.01) | |

(Continued)

(52) U.S. Cl.
CPC .......... *G06F 3/04812* (2013.01); *G06F 3/0346* (2013.01); *G06F 3/0482* (2013.01); *H04N 21/42222* (2013.01); *H04N 21/4852* (2013.01); *H04N 21/4854* (2013.01); *H04N 21/4312* (2013.01)

(58) Field of Classification Search
CPC .. G06F 3/04842; G06F 3/0481; G06F 3/0482

USPC .................. 715/856–858, 711; 345/156–158
See application file for complete search history.

(56) References Cited

U.S. PATENT DOCUMENTS

| | | | | |
|---|---|---|---|---|
| 5,596,347 A | * | 1/1997 | Robertson et al. | 715/856 |
| 5,598,183 A | * | 1/1997 | Robertson et al. | 715/856 |
| 5,808,604 A | * | 9/1998 | Robin | 715/862 |

(Continued)

FOREIGN PATENT DOCUMENTS

| | | |
|---|---|---|
| CN | 1251435 A | 4/2000 |
| CN | 101261565 A | 9/2008 |
| EP | 0 994 408 A2 | 4/2000 |

OTHER PUBLICATIONS

Anand Kanse, "Automatically move the mouse pointer to the dialog box in Windows," Mar. 7, 2010, The Windows Club, http://www.thewindowsclub.com/automatically-move-the-mouse-pointer-to-the-dialog-box-in-windows.*

*Primary Examiner* — Sanjiv D Patel
(74) *Attorney, Agent, or Firm* — Birch, Stewart, Kolasch & Birch, LLP

(57) ABSTRACT

An image display apparatus and a method for operating the same are discussed. According to an embodiment, the method for operating the image display apparatus having a display screen, includes processing a signal for displaying a first object; associating, by the image display apparatus, the first object with a pointer to be displayed, the pointer being movable according to a pointing operation of a pointing device associated with the image display apparatus; and automatically displaying, by the image display apparatus on the display screen, the first object and the pointer on the first object based on the associating step.

9 Claims, 21 Drawing Sheets

(51) Int. Cl.
*G06F 3/0482* (2013.01)
*H04N 21/431* (2011.01)

(56) References Cited

U.S. PATENT DOCUMENTS

| | | | | |
|---|---|---|---|---|
| 6,018,340 A * | 1/2000 | Butler et al. | ................. | 715/764 |
| 6,031,531 A * | 2/2000 | Kimble | ....................... | 715/862 |
| 6,137,487 A * | 10/2000 | Mantha | ......................... | 715/767 |
| 6,587,131 B1 * | 7/2003 | Nakai et al. | .................. | 715/857 |
| 7,154,473 B2 * | 12/2006 | Kim | ............................. | 345/157 |
| 7,296,230 B2 * | 11/2007 | Fukatsu et al. | ............... | 715/711 |
| 2002/0122027 A1 * | 9/2002 | Kim | ............................. | 345/167 |
| 2002/0149612 A1 * | 10/2002 | Malamud et al. | ............ | 345/711 |
| 2003/0081016 A1 * | 5/2003 | Rahimzadeh et al. | ........ | 345/864 |
| 2003/0234768 A1 * | 12/2003 | Rekimoto et al. | ............ | 345/169 |
| 2004/0004632 A1 * | 1/2004 | Knight et al. | ................. | 345/711 |
| 2004/0165013 A1 * | 8/2004 | Nelson et al. | ................. | 345/858 |
| 2004/0230918 A1 * | 11/2004 | Maruyama | .................... | 715/856 |
| 2006/0066638 A1 * | 3/2006 | Gyde et al. | ..................... | 345/635 |
| 2006/0095867 A1 * | 5/2006 | Rogalski et al. | .............. | 715/858 |
| 2008/0222569 A1 | 9/2008 | Champion et al. | | |
| 2010/0122194 A1 * | 5/2010 | Rogers | ......................... | 715/769 |
| 2010/0185985 A1 * | 7/2010 | Chmielewski et al. | ........ | 715/834 |
| 2010/0332372 A1 * | 12/2010 | Kirwin et al. | .................... | 705/37 |

\* cited by examiner

FIG. 6
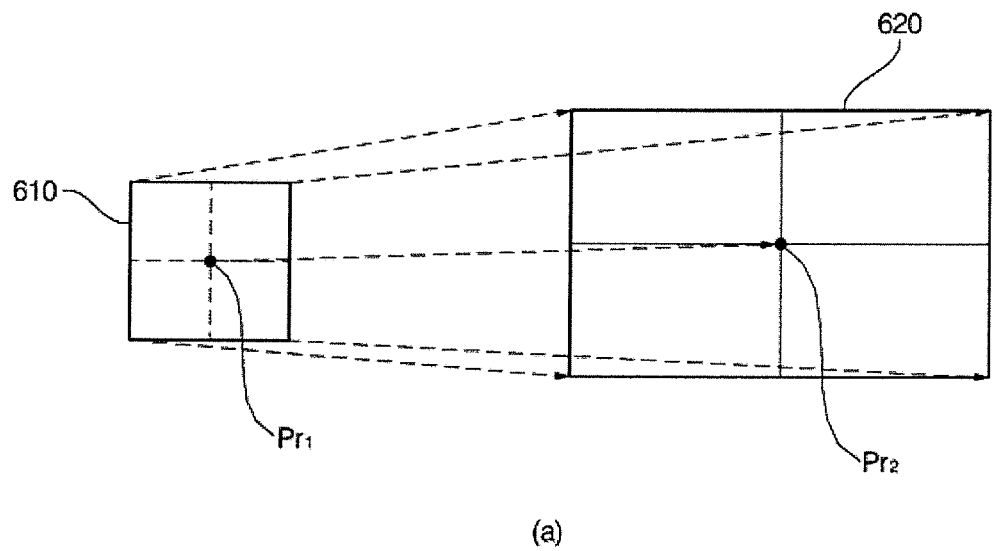
(a)
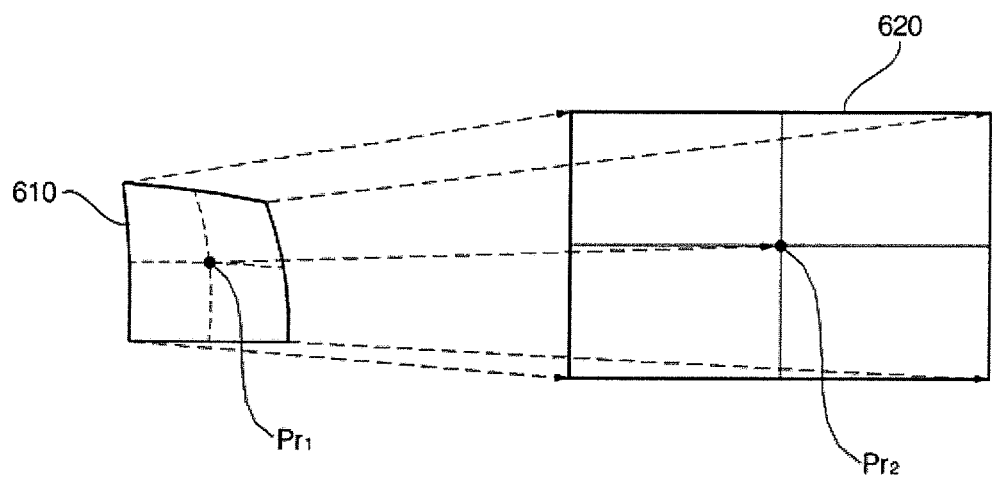
(b)

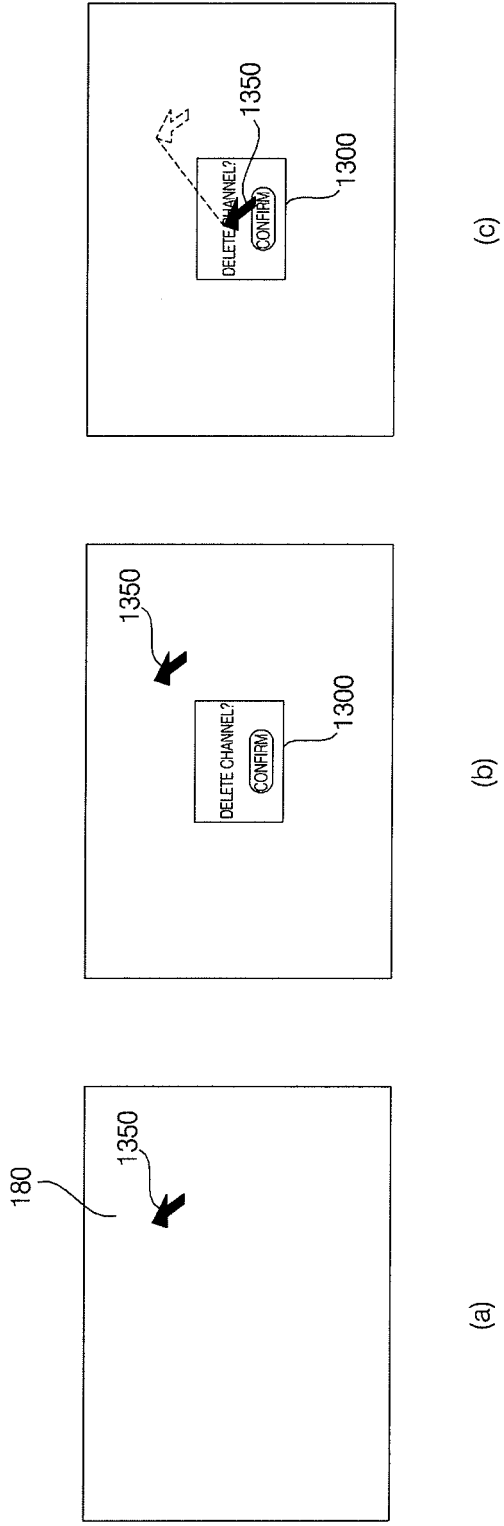

IMAGE DISPLAY APPARATUS AND METHOD FOR OPERATING THE SAME

CROSS-REFERENCE TO RELATED APPLICATION

This application claims the priority benefit of Korean Patent Application No. 10-2010-0089095, filed on Sep. 10, 2010 in the Korean Intellectual Property Office and the priority benefit of U.S. Provisional Application No. 61/437,670 filed on Jan. 30, 2011 in the USPTO. The entire contents of each of these applications are incorporated herein by reference.

BACKGROUND OF THE INVENTION

1. Field of the invention

The present invention relates to an image display apparatus and a method for operating the same, and more particularly, to an image display apparatus and a method for operating the same, which increase user convenience.

2. Description of the Related Art

An image display apparatus has a function of displaying images to a user. The image display apparatus can display a broadcast program selected by the user on a display from among broadcast programs transmitted from broadcasting stations. The transition from analog broadcasting to digital broadcasting is now progressing worldwide.

As digital audio and video signals are transmitted, digital broadcasting offers many advantages over analog broadcasting, such as robustness against noise, less data loss, ease of error correction, and the ability to provide clear, high-definition images. Digital broadcasting also allows interactive viewer services.

In compliance with the foregoing tendency, a remote controller for increasing user convenience has recently been researched by many developers and companies.

SUMMARY OF THE INVENTION

Therefore, the present invention has been made in view of the above problems and other limitations, and it is an object of the present invention to provide an image display apparatus and a method for operating the same, which can increase user convenience.

In accordance with an aspect of the present invention, the above and other objects can be accomplished by the provision of a method for operating an image display apparatus, a method for operating an image display apparatus including receiving a signal from a pointing device, calculating display coordinates for displaying a pointer on the basis of the received signal, and displaying the pointer at a position corresponding to the calculated coordinates when the calculated coordinates are within an absolute coordinate region.

In accordance with another aspect of the present invention, a method for operating an image display apparatus includes receiving a signal from a pointing device, calculating display coordinates for displaying a pointer on the basis of the received signal, and displaying the pointer on the display according to the calculated coordinates. In this case, in calculation of the display coordinates, different coordinate calculation methods may be applied on the basis of the position information of the pointing device.

In accordance with another aspect of the present invention, a method for operating an image display apparatus includes displaying an object on a display, displaying a pointer on a region on which the object is displayed, receiving a signal from the pointing device, calculating display coordinates for displaying the pointer using a relative coordinate calculation method on the basis of the received signal, and moving and displaying the pointer on the basis of the calculated coordinates.

In accordance with another aspect of the present invention, a method for operating an image display apparatus including a display screen, includes processing a signal for displaying a first object; associating, by the image display apparatus, the first object with a pointer to be displayed, the pointer being movable according to a pointing operation of a pointing device associated with the image display apparatus; and automatically displaying, by the image display apparatus on the display screen, the first object and the pointer on the first object based on the associating step.

In accordance with another aspect of the present invention, an image display apparatus includes a display screen; and a controller configured to process a signal for displaying a first object, and to associate the first object with a pointer to be displayed, the pointer being movable according to a pointing operation of a pointing device associated with the image display apparatus, the controller further configured to automatically display on the display screen the first object and the pointer on the first object based on the association of the first object with the pointer.

In accordance with still another aspect of the present invention, an image display apparatus includes a display for displaying a pointer on a display region, a user input interface for calculating display coordinates on the basis of a signal received from a pointing device, and a controller. If the calculated coordinates are within an absolute coordinate region, the controller displays the pointer at a point corresponding to the calculated coordinates. If the calculated coordinates are within a relative coordinate region, the controller displays the pointer on the basis of previous display position information of the pointer and variation of operation coordinates of the pointing device.

BRIEF DESCRIPTION OF THE DRAWINGS

The above and other objects, features and other advantages of the present invention will be more clearly understood from the following detailed description taken in conjunction with the accompanying drawings, in which:

FIGS. 6 to 10 illustrate a variety of examples of a method for operating the image display apparatus according to one embodiment of the present invention.

FIGS. 12 to 18 illustrate a variety of examples of a method for operating the image display apparatus according to one embodiment of the present invention.

DETAILED DESCRIPTION OF THE PREFERRED EMBODIMENTS

Embodiments of the present invention will be described below with reference to the attached drawings.

The terms "module" and "unit" used to signify components are used herein to aid in the understanding of the components and thus they should not be considered as having specific meanings or roles. Accordingly, the terms "module" and "unit" may be used interchangeably.

An image display apparatus as set forth herein is an intelligent image display apparatus equipped with a computer support function in addition to a broadcast reception function, for example. Thus the image display apparatus may have user-friendly interfaces such as a handwriting input device, a touchscreen, or a pointing device serving as a remote controller. Further, because the image display apparatus supports wired or wireless Internet/network, it is capable of e-mail transmission/reception, Web browsing, banking, gaming, etc. by connecting to the Internet, other network, or a computer. To implement these functions, the image display apparatus may operate based on a standard general-purpose Operating System (OS).

Various applications can be freely added to or deleted from, for example, a general-purpose OS kernel in the image display apparatus according to the present invention. Therefore, the image display apparatus may perform a number of user-friendly functions. The image display apparatus may be a smart TV, a digital TV, a computer notebook, a mobile terminal, a navigation device, a portable multimedia device, or an electronic device having a display unit.

Figure 1:
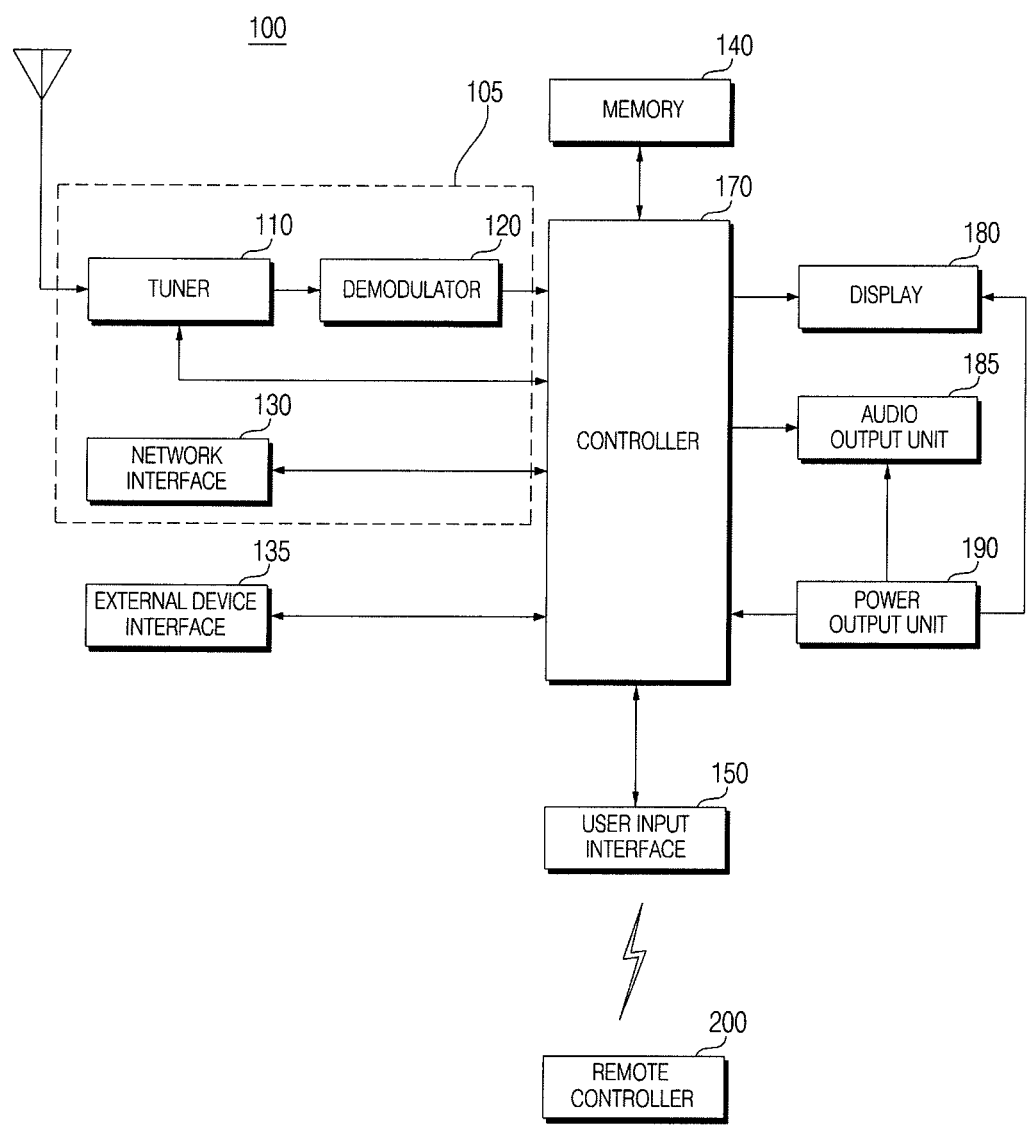
FIG. 1 is a block diagram illustrating an image display apparatus according to one embodiment of the present invention.

FIG. 1 is a detailed block diagram illustrating an image display apparatus according to one embodiment of the present invention.

Referring to FIG. 1, an image display apparatus 100 according to one embodiment of the present invention includes a broadcasting receiver 105, an external device interface 135, a memory 140, a user input interface 150, a controller 170, a display 180, an audio output unit 185, and a power supply unit 190. The broadcasting receiver 105 may include one or more tuners 110, a demodulator 120 and a network interface 130. As needed, the broadcasting receiver 105 may be configured so as to include only the tuner 110 and the demodulator 120 or only the network interface 130. All components of the image display apparatus 100 are operatively coupled and configured.

The tuner 110 selects a Radio Frequency (RF) broadcast signal corresponding to a channel selected by a user from among a plurality of RF broadcast signals received through an antenna and converts the selected RF broadcast signal into an Intermediate Frequency (IF) signal or a baseband audio/video (A/V) signal.

More specifically, if the selected RF broadcast signal is a digital broadcast signal, the tuner 110 converts the selected RF broadcast signal into a digital IF signal DIF. On the other hand, if the selected RF broadcast signal is an analog broadcast signal, the tuner 110 converts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may convert the selected RF broadcast signals into IF signals or baseband A/V signals.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS from the demodulator 120 may be input to the controller 170 and thus subjected to demultiplexing and A/V signal processing. The processed video and audio signals are output to the display 180 and the audio output unit 185, respectively.

The external device interface 135 may serve as an interface between an external device and the image display apparatus 100. For interfacing, the external device interface 135 may include an A/V Input/Output (I/O) unit and/or a wireless communication module.

The external device interface 135 may be connected to an external device such as a Digital Versatile Disk (DVD) player, a Blu-ray player, a game console, a camera, a camcorder, or a computer (e.g., a laptop), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit and/or the wireless communication module.

The A/V I/O unit of the external device interface 135 may include a Universal Serial Bus (USB) port, a Composite Video, Blanking and Sync (CVBS) port, a Component Video port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports and may thus receive data from or transmit data to the various set-top boxes.

The external device interface 135 may receive applications or an application list from an adjacent external device and provide the applications or the application list to the controller 170 or the memory 140.

The network interface 130 serves as an interface between the image display apparatus 100 and a wired/wireless network such as the Internet, intranet, extranet, etc. The network interface 130 may include an Ethernet port for connection to a wired network. For connection to wireless networks, the network interface 130 may use Wireless Local Area Network (WEAN) (i.e., Wi-Fi), Wireless Broadband (WiBro), World Interoperability for Microwave Access (WiMax), and High Speed Downlink Packet Access (HSDPA).

The network interface 130 may access a specific Web page over a connected network or another network linked to the connected network. For example, the network interface 130 may access a specific Web page over a network and transmit or receive data to or from a server. Additionally, the network interface 130 may receive content or data from a content provider (CP) or a network provider (NP). Specifically, the network interface 130 may receive content such as movies, advertisements, games, VoD files, and broadcast signals, and information related to the content from a CP or an NP. Also, the network interface 130 may receive update information about firmware and update files of the firmware from the NP. The network interface 130 may transmit data over the Internet or to the CP or the NP.

The network interface 130 may selectively receive a desired application among open applications over a network.

The memory 140 may store various programs necessary for the controller 170 to process and control signals, and may also store processed video, audio and data signals. The memory 140 may temporarily store a video, audio and/or data signal received from the external device interface 135 or the network interface 130. The memory 140 may store information about broadcast channels by the channel-add function. The memory 140 may store applications or a list of applications received from the external device interface 135 or the network interface 130.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), an optical disk, a removable storage unit such as a SIM card or memory stick, a Random Access Memory (RAM), or a Read-Only Memory (ROM) such as an Electrically Erasable and Programmable Read Only Memory. The image display apparatus 100 may reproduce content stored in the memory 140 (e.g. video files, still image files, music files, text files, and application files) to the user.

While the memory 140 in FIG. 1 is shown as configured separately from the controller 170, to which the present invention is not limited, the memory 140 may be incorporated into the controller 170, for example.

The user input interface 150 transmits a signal received from the user to the controller 170 or transmits a signal received from the controller 170 to the user. For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys, such as inputs of a power key, a channel key, a volume key, and setting values.

Also, the user input interface 150 may transmit a control signal received from a sensor unit for sensing a user gesture to the controller 170 or transmit a signal received from the controller 170 to the sensor unit. The sensor unit may include a touch sensor, a voice sensor, a position sensor, a motion sensor, etc. Further, the user input interface 150 may receive an input (e.g., touch input) made to the screen of the display 180 or an input made by the user using an input unit of the apparatus 100. The input unit of the apparatus 100 may include, e.g., a keyboard, a touch screen, a keypad, a stylus, a mouth, a camera (e.g., for capturing an input gesture made by a hand of the user), etc.

The controller 170 may demultiplex the stream signal TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

The controller 170 may further include a DEMUX and a video processor, which will be described later with reference to FIG. 2. In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. Particularly, the controller 170 may access a network and download an application or application list selected by the user to the image display apparatus 100 over the network.

For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or moving picture.

If an application view menu item is selected by the user via the remote controller 200 or other means, the controller 170 may control display of applications or a list of applications that are available in the image display apparatus 100 or downloadable from an external network.

The controller 170 may control installation and execution of an application downloaded from the external network along with various user interfaces (UIs). Also, the controller 170 may control display of an image related to the executed application on the display 180, upon user selection.

On the other hand, if a keyword related to the displayed image is input, the controller 170 controls display of the collected information on the display 180. Upon receiving a zoom-in or zoom-out command from the remote controller 200, the related information is zoomed in or out by the controller 170. The zoom-in or zoom-out operation is performed when the remote controller 200 moves away from the display 180 or approaches the display 180, resulting in an increase in user convenience.

If the displayed image is a moving image, the controller 170 may stop playing the moving image on the display 180 upon receiving a keyword from the user. In this case, an object indicating playback of the image may also be displayed on the display 180.

In order to enable the user to enter a keyword, the controller 170 may display a keyboard on the display 180. If one or more characters are selected by the user from among the displayed keys using the remote controller 200 or the other input unit, the controller 170 recognizes the input of the corresponding characters.

If a character is selected through a button of the image display device 200, the controller 170 recognizes the input of the corresponding character on the basis of the corresponding reception signal.

In addition, a keyword input may also be carried out via voice recognition. For such voice recognition, the controller 170 may include a voice recognition algorithm. The user's voice may be recognized by real-time execution of the corresponding algorithm.

In addition, the keyword input may be carried out, under the condition that captions (or subtitles) or broadcast information related to the displayed image are displayed on the display 180, by a user input operation or by user selection of a word from among the displayed captions or broadcast images.

If some regions of the displayed image are selected by the user, the controller 170 recognizes the input of a keyword corresponding to an image of the selected region. For example, the controller 170 searches for an image of the selected region in the image display apparatus or the network, and recognizes corresponding content by detecting an image similar to the corresponding image in such a manner that it can also derive a keyword. Alternatively, the image display apparatus can derive a keyword using metadata added to an image of the selected region or related information contained in the metadata.

In order to display search results, the controller 170 displays a plurality of menu items in which related information is arranged on one region of the display 180, and the related information for menu items selected from among the displayed menu items may also be displayed on another region of the display 180 as needed. The menu items may include one or more of a music menu item, a movie menu item, a Web search menu item, a map menu item, and an application menu item. Addition or deletion of such items may be performed according to user setup information, and the arrangement order of the menu items on the display 180 may also be changed according to priority information.

For example, if an application view menu item is selected, the controller 170 may control display of applications or a list of applications that are available in the image display apparatus or downloadable from an external network, on the display 180.

The controller 170 may control installation and execution of an application downloaded from the external network along with various UIs. Also, the controller 170 may control display of an image related to the executed application on the display 180, upon user selection, on the display 180.

If the user enters a specific input signal for searching for a desired part from among a currently displayed image on the display 180, the controller 170 displays a search window on the display 180. The search window may be displayed on a region of the display 180 different from that of the displayed image, or may be partially overlapped with another area.

On the other hand, if the user enters an exit command for displaying the associated information or an exit command for zooming in on or zooming out of the image (e.g., via the remote controller 200 or other input unit), the controller 170 may display the previously displayed image on the display 180. In this case, a playback object for indicating the image playback may be displayed on the display 180.

The image display apparatus 100 may further include a channel browsing processor for generating thumbnail images corresponding to channel signals or externally input signals. The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images in the thumbnail list may be updated sequentially or simultaneously. Therefore, the user can readily recognize the content of broadcast programs received through a plurality of broadcast channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display. The display 180 may also be a touchscreen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

The image display apparatus 100 may further include a camera unit for capturing images of a user. As a variation, the camera may be an external device configured to communicate with the image display apparatus 100. Although the camera unit may be implemented as one camera, the number of cameras is not limited thereto and a plurality of cameras may also be used as needed. Image information captured by the camera unit may be input to the controller 170.

To sense a user gesture, the image display apparatus 100 may further include the sensor unit that has at least one of a touch sensor, a voice sensor, a position sensor, and a motion sensor, as stated before. A signal sensed by the sensor unit may be output to the controller 170 through the user input interface 150.

The controller 170 may sense a user gesture from an image captured by the camera unit or a signal sensed by the sensor unit, or by combining the captured image and the sensed signal.

The power supply unit 190 supplies power to the image display apparatus 100. Particularly, the power supply unit 190 may supply power to the controller 170, the display 180, and the audio output unit 185, which may be implemented as a System On Chip (SOC).

For supplying power, the power supply unit 190 may include a converter for converting Alternating Current (AC) into Direct Current (DC). If the display 180 is configured with, for example, a liquid crystal panel having a plurality of backlight lamps, the power supply unit 190 may further include an inverter capable of performing Pulse Width Modulation (PWM) for luminance change or dimming.

The remote controller 200 transmits a user input to the user input interface 150. For transmission of user input, the remote controller 200 may use various communication techniques such as Bluetooth, RF communication, IR communication, UWB and ZigBee.

In addition, the remote controller 200 may receive a video signal, an audio signal and/or a data signal from the user input interface 150 and output the received signals visually, audibly or as vibrations.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs.

On the other hand, the image display apparatus according to an embodiment of the present invention may exclude the display 180 and the audio output unit 185 from the constituent elements of FIG. 1. For example, the image display apparatus may be a wireless-type device that is capable of transmitting and receiving data to and from the display 180 and the audio output unit 185, which may external devices.

The block diagram of the image display apparatus 100 illustrated in FIG. 1 is purely exemplary. Depending upon the specifications of the image display apparatus 100 in actual implementation, the components of the image display apparatus 100 may be combined or omitted or new components may be added. That is, two or more components of the image display apparatus can be incorporated into one component or one component may be configured as separate components, as needed. In addition, the function of each block is described for the purpose of describing the embodiments of the present invention and thus specific operations or devices should not be construed as limiting the scope and spirit of the present invention.

Unlike the configuration illustrated in FIG. 1, the image display apparatus 100 may be configured so as to receive and playback video contents received through the network interface 130 or the external device interface 135, without the tuner 100 and the demodulator 120.

The image display apparatus 100 is an example of an image signal processing apparatus that processes a stored image or an input image. Other examples of the image signal processing apparatus include a set-top box without the display 180 and the audio output unit 185, a DVD player, a Blu-ray player, a game console, and a computer.

Figure 2:
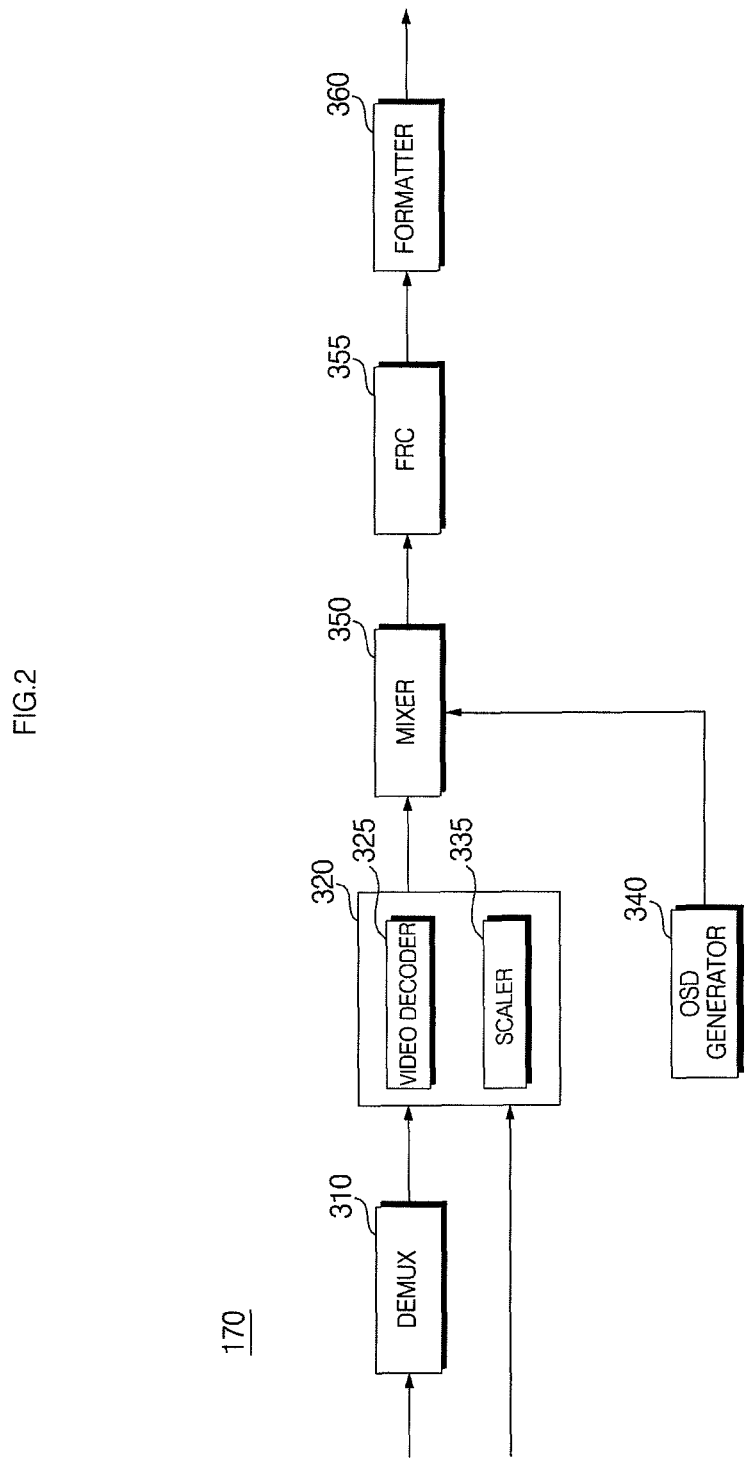
FIG. 2 is a block diagram illustrating an example of a controller shown in FIG. 1.

FIG. 2 is a block diagram of an example of the controller illustrated in FIG. 1.

Referring to FIG. 2, the controller 170 may include a DEMUX (demultiplexer) 310, a video processor 320, an OSD (on-screen display) generator 340, a mixer 350, a Frame Rate Converter (FRC) 355, and a formatter 360 according to an embodiment of the present invention. The controller 170 may further include an audio processor and a data processor.

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180. The video decoder 325 may be provided with decoders that operate based on various standards.

If the demultiplexed video signal is, for example, an MPEC-2 encoded video signal, the video signal may be decoded by an MPEC-2 decoder.

On the other hand, if the video signal is an H.264-encoded DMB or DVB-handheld (DVB-H) signal, the video signal may be decoded by an H.264 decoder.

The video signal decoded by the video processor 320 is provided to the mixer 350.

The OSD generator 340 generates an OSD signal automatically or according to a user input. For example, the OSD generator 340 may generate signals by which a variety of information is displayed as images or text on the display 180, according to control signals received from the user input interface 150. The OSD signal may include various data such as a UI, a variety of menu screens, widgets, icons, etc.

For example, the OSD generator 340 may generate a signal by which captions (subtitles) are displayed for a broadcast image or Electronic Program Guide (EPG)-based broadcasting information.

The mixer 350 may mix the decoded video signal with the OSD signal and output the mixed signal to the formatter 360, e.g., through the FRC 355. As the decoded broadcast video signal or the external input signal is mixed with the OSD signal, an OSD may be overlaid on the broadcast image or the external input image.

The FRC 355 may change the frame rate of an input image received from the mixer 350. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 360 changes the format of the signal received from the FRC 355 to be suitable for the display 180. For example, the formatter 360 may convert the received signal into an RGB data signal. The RGB signal may be output in the form of a Low Voltage Differential Signal (LVDS) or mini-LVDS.

The audio processor of the controller 170 may process the demultiplexed audio signal. For audio signal processing, the audio processor may have a plurality of decoders.

If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder. The audio processor of the controller 170 may also adjust the bass, treble or volume of the audio signal.

The data processor of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI may be included in the header of a TS, i.e., a 4-byte header of an MPEG-2 TS.

The block diagram of the controller 170 illustrated in FIG. 2 is an example of the present invention. Depending upon the specifications of the controller 170, the components of the controller 170 may be combined, or omitted. Or new components are added to the controller 170.

Figure 3:
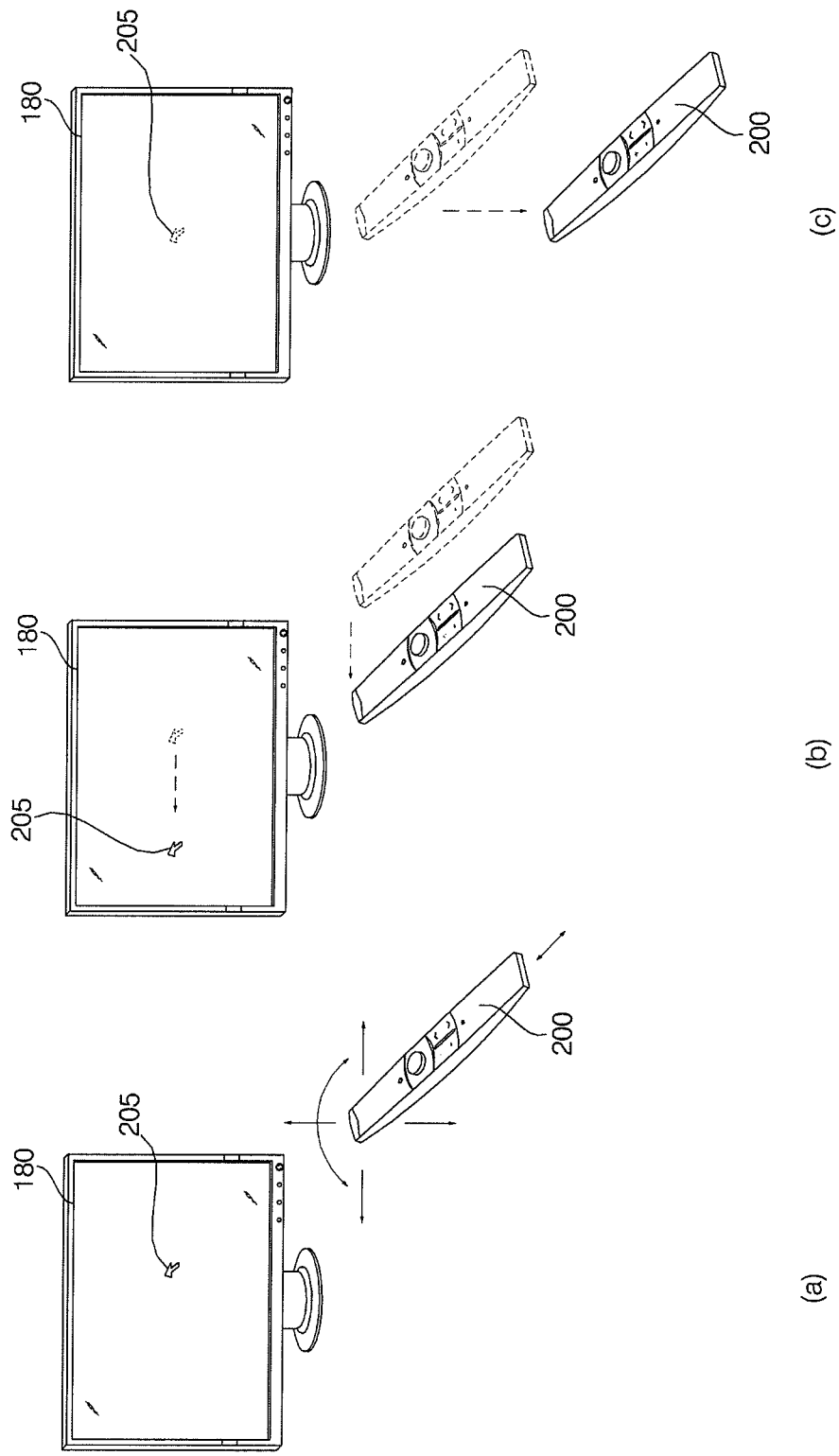
FIG. 3 illustrates a variety of operations of a remote controller shown in FIG. 1.

FIG. 3 illustrates a variety of operations of the remote controller shown in FIG. 1.

Referring to FIG. 3, the remote controller 200 may transmit and receive signals to and from the image display apparatus 100 according to an RF or IR communication standard.

FIG. 3(a) illustrates a screen on which a pointer 205 representing a corresponding movement of the remote controller 200 is displayed.

The user points the remote controller 200 toward the image display apparatus 100 and may move the remote controller 200 up and down, side to side (see FIG. 3(b)), and back and forth (see FIG. 3(c)). The pointer 205 is then moved in accordance with the movement of the remote controller 200 as illustrated in FIGS. 3(a), 3(b) and 3(c). In this context, since the pointer 205 moves correspondingly in response to the movement of the remote controller 200 in 3D space, the remote controller 200 may also be referred to as a pointing device since it is an example of the pointing device.

Referring to FIG. 3(b), if the user moves the remote controller 200 to the left, the pointer 205 displayed on the display 180 of the image display apparatus 100 moves to the left accordingly. A sensor of the remote controller 200 detects the movement of the remote controller 200 and transmits motion information corresponding to the result of the movement detection to the image display apparatus 100. Then, the image display apparatus 100 determines the movement of the remote controller 200 based on the motion information received from the remote controller 200, and calculates the coordinates of a target point to which the pointer 205 should be shifted on the display 180 in accordance with movement of the remote controller 200 based on the result of the determination. The image display apparatus 100 then moves the pointer 205 to the calculated coordinates on the display 180 and displays the pointer 205 at the calculated coordinates.

Referring to FIG. 3(c), in this example, while pressing a predetermined button of the remote controller 200, the user may move the remote controller 200 farther from the display 180. Then, a selected area on the display 180 corresponding to the current location of the pointer 205 may be zoomed in and is displayed as enlarged on the display 180. On the contrary, if the user moves the remote controller 200 toward the display 180 while the predetermined button is selected, the selection area corresponding to the pointer 205 is zoomed out and is displayed as reduced on the display 180. The opposite case is possible. That is, when the remote controller 200 is moved away from the display 180 while the predetermined button is pressed, the selected area corresponding to the location of the pointer 205 may be zoomed out. On the other hand, when the remote controller 200 is moved toward the display 180 while the predetermined button is pressed, the selected area may be zoomed in on the display 180.

Here, with the predetermined button of the remote controller 200 pressed, the up, down, left and right movements of the remote controller 200 may be ignored. For example, when the remote controller 200 moves away from or toward the display 180, only the back and forth movements of the remote controller 200 are sensed, while the up, down, left and right movements of the remote controller 200 are ignored. Unless the predetermined button of the remote controller 200 is kept pressed, the pointer 205 may move in accordance with the up, down, left or right movement of the remote controller 200.

The moving speed and direction of the pointer 205 may correspond to the moving speed and direction of the remote controller 200. For instance, when the remote controller 200 is moved quickly, then the pointer 205 may be moved quickly, e.g., according to the moving speed of the remote controller 200.

The pointer 205 is preferably an object displayed on the display 180 in correspondence with a movement of the remote controller 200. Therefore, the pointer 205 may be one or more objects of various shapes other than an arrow illustrated in FIGS. 3(a), 3(b) and 3(c). For example, the pointer 205 may be shaped into a dot, a circle, a cross, a cursor, a prompt, a thick outline, etc. The pointer 205 may be displayed across a plurality of points, such as a line and a surface, as well as at a single point on horizontal and vertical axes.

The pointing device 200 in FIGS. 3(a)-3(c) is an example of the remote controller 200 for entering a command to the image display device 100. In accordance with the exemplary embodiment of the present invention, the pointing device 200 transmits and receives signals to and from the image display device 100 in compliance with an RF communication standard.

Figure 4A:
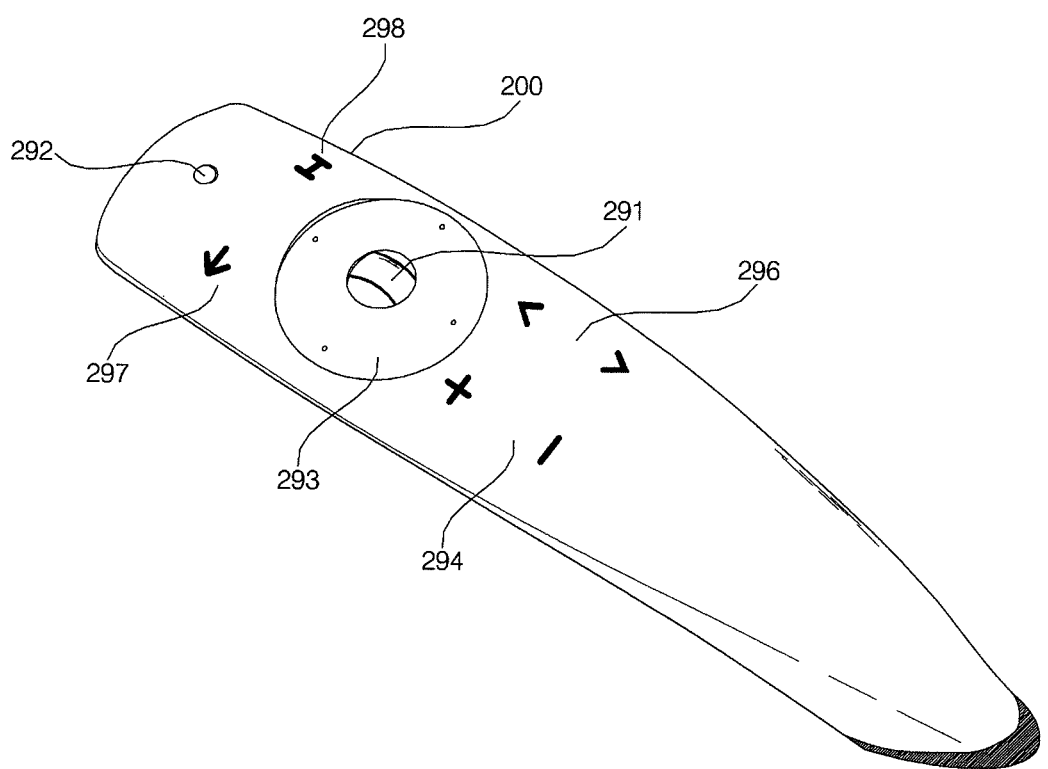
FIG. 4A is a perspective view of an image display device and a pointing device able to input a command to the image display device according to an embodiment of the present invention.

FIG. 4A shows an example of the pointing device 200 according to an embodiment of the present invention.

Referring to FIG. 4A, the pointing device 200 according to the embodiment of the present invention may include various input keys, input buttons, etc.

For example, the pointing device 200 may include an okay key 291, a menu key 292, a 4-direction key 293, a channel control key 294, and a volume control key 296.

For example, the okay key 291 may be used to select a menu or item, the menu key 292 may be used to display a predetermined menu, the 4-direction key 294 may be used to move a pointer or indicator up, down, left and right, the channel control key 294 may be used to move a channel up or down, and the volume control key 296 may be used for volume control. The okay key 291 may also be a select key, an enter key, etc.

The pointing device 200 may further include a back key 297 and a home key 298. For example, the back key 297 may be used to move a screen to a previous screen and the home key 298 may be used to move a screen to a home screen.

As shown in FIG. 4A, the okay key 291 may further include a scroll function. For the scroll function, the okay key 291 may be implemented as a wheel key. For instance, if the okay key 291 is pushed, the okay key 291 is used to select a menu or item and, if the okay key 291 is scrolled up or down, the okay key 291 is used to scroll a display screen or switch a list page.

More specifically, when the okay key 291 is scrolled for image searching in a state in which an image having a size greater than the size of the display is displayed on the display 180, an image region which is not currently displayed is displayed on the display. As another example, if the okay key 291 is scrolled in a state in which a list page is displayed on the display 180, a previous page or a next page of a current page may be displayed. Also such a scroll function may be included separately from the okay key 291.

The four-direction key 293 may include up, down, left and right keys in a circular shape as shown in FIG. 4A. Touch input using the four-direction key 293 may be possible. For example, if a touch operation from the up key to the down key in the four-direction key 293 is performed, a set function may be input or performed according to the touch input FIG. 4B is a detailed block diagram illustrating an example of the remote controller 200 shown in FIG. 1.

Figure 4B:
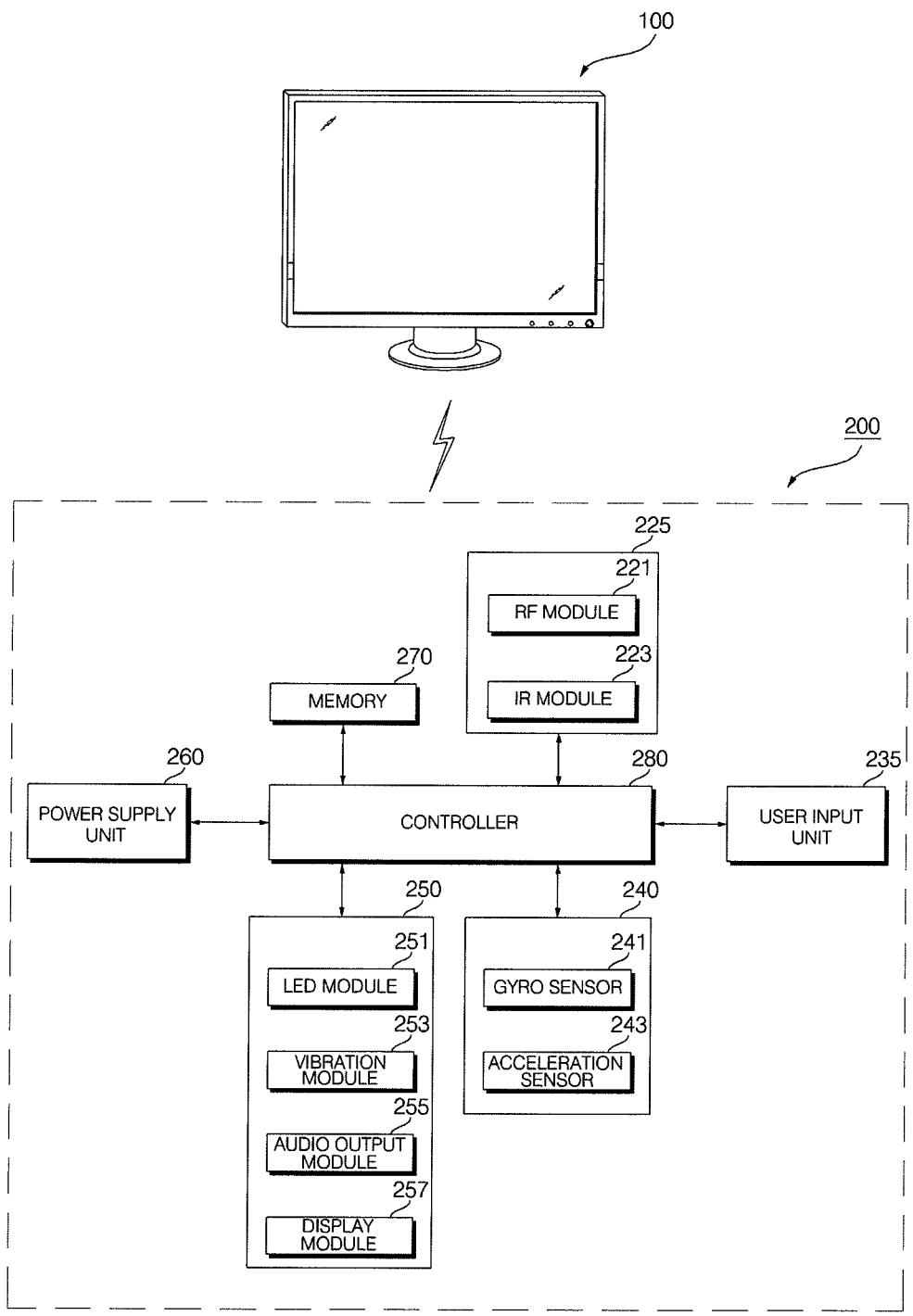
FIG. 4B is a block diagram illustrating an example of the remote controller shown in FIG. 1.

Referring to FIG. 4B, the remote controller 200 may include a wireless communication module 225, a user input unit 235, a sensor unit 240, an output unit 250, a power supply unit 260, a memory 270, and a controller 280. All components of the remote controller 200 are operatively coupled and configured.

The wireless communication module 225 transmits signals to and/or receives signals from the image display apparatus 100. The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

In this embodiment, the remote controller 200 transmits motion information representing the movement of the remote controller 200 to the image display apparatus 100 through the RF module 221. The remote controller 200 may also receive signals from the image display apparatus 100 through the RF module 221. As needed, the remote controller 200 may transmit commands such as a power on/off command, a channel switch command, or a volume change command to the image display apparatus 100 through the IR module 223.

The user input unit 235 may include a keypad, a plurality of buttons, a touchpad and/or a touchscreen. The user may enter commands to the image display apparatus 100 by manipulating the user input unit 235. If the user input unit 235 includes a plurality of hard buttons, the user may input various commands to the image display apparatus 100 by pressing the hard buttons. Alternatively or additionally, if the user input unit 235 includes a touchscreen displaying a plurality of soft keys, the user may input various commands to the image display apparatus 100 by touching the soft keys. The user input unit 235 may also include various input tools other than those set forth herein, such as a scroll key and/or a jog wheel, which should not be construed as limiting the present invention.

The sensor unit 240 may include a gyro sensor 241 and/or an acceleration sensor 243. The gyro sensor 241 may sense the movement of the remote controller 200, for example, along X-, Y-, and Z-axes, and the acceleration sensor 243 may sense the speed of the remote controller 200. The sensor unit 240 may further include a distance sensor for sensing the distance between the remote controller 200 and the display 180.

The output unit 250 may output a video and/or audio signal corresponding to manipulation of the user input unit 235 or corresponding to a signal received from the image display apparatus 100. The user may easily identify whether the user input unit 235 has been manipulated or whether the image display apparatus 100 has been controlled, based on the video and/or audio signal output by the output unit 250.

The output unit 250 may include a Light Emitting Diode (LED) module 251 which is turned on or off whenever the user input unit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply unit 260 supplies power to the remote controller 200. If the remote controller 200 is kept stationary for a predetermined time or longer, the power supply unit 260 may, for example, reduce or shut off supply of power to the remote controller 200 in order to save power. The power supply unit 260 may resume power supply if a predetermined key on the remote controller 200 is manipulated.

The memory 270 may store various types of programs and application data necessary to control or drive the remote controller 200. The remote controller 200 may wirelessly transmit signals to and/or receive signals from the image display apparatus 100 over a predetermined frequency band with the aid of the RF module 221. The controller 280 of the remote controller 200 may store information regarding the frequency band used for the remote controller 200 to wirelessly transmit signals to and/or wirelessly receive signals from the paired image display apparatus 100 in the memory 270, for later use.

The controller 280 provides overall control to the remote controller 200. The controller 280 may transmit a signal corresponding to a key manipulation detected from the user input unit 235 or a signal corresponding to motion of the remote controller 200, as sensed by the sensor unit 240, to the image display apparatus 100 via the wireless communication unit 225.

Figure 5:
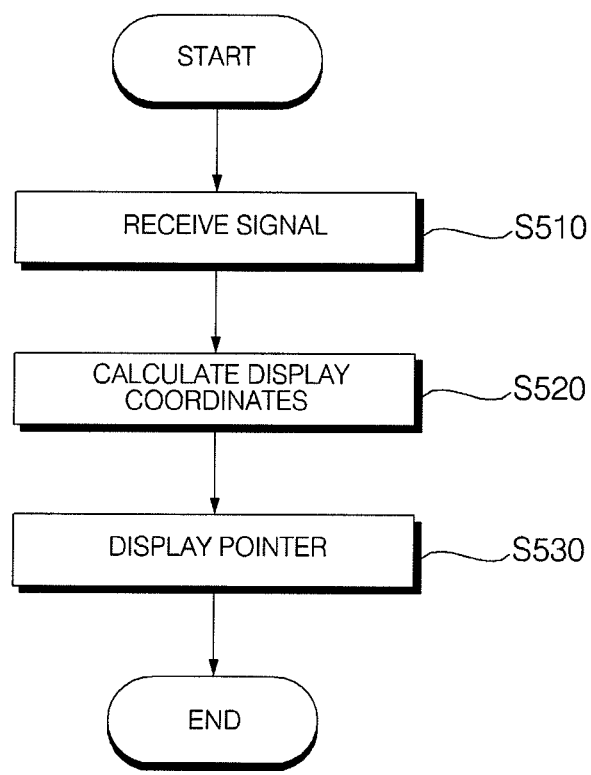
FIG. 5 is a flowchart illustrating a method for operating the image display apparatus according to one embodiment of the present invention.

FIG. 5 is a flowchart illustrating a method for operating the image display apparatus according to one embodiment of the present invention. FIGS. 6 to 10 illustrate a variety of examples of a method for operating the image display apparatus according to one embodiment of the present invention. The methods of FIGS. 6 to 10 can be implemented by using the devices of FIGS. 1-4, but can be also implemented by other suitable device(s).

Referring to FIG. 5, the image display apparatus 100 receives a signal from a pointing device such as the remote controller 200 at step S510, and calculates display coordinates for displaying the pointer on the basis of the received signal at step S520. The coordinates may correspond to a location on the display 180 at which the pointer may be displayed according to the signal from the pointing device. The calculation of the display coordinates may be carried out by the coordinate calculator of the user input interface 150 or the controller 170 of the image display apparatus.

Thereafter, the pointer such as the pointer 205 is displayed on the display 180 on the basis of the calculated display coordinates at step S530. For instance, the pointer is displayed at the calculated display coordinates on the display 180.

According to an embodiment of the present invention, an operation region depending on the operation coordinates of a pointing device is matched to a display region depending on the display coordinates of the image display apparatus 100. FIG. 6 is a conceptual diagram illustrating initiation and matching operations for use in the calculation method based on absolute coordinates. Specifically, as shown in FIG. 6, an operation region 610 obtained from a pointing device 301 is matched to or corresponds to a display region 620 of the display 180.

For example, the reference operation coordinates (Pr1) of the pointing device 301 are mapped to the reference display coordinates (Pr2) of the display region 620. Accordingly, the operation region 610 obtained from the pointing device 301 is matched to the display region 620. In case of the initiation operation, the matching of the operation and display regions 610 and 620 may be carried out when the image display apparatus 100 is powered on by the pointing device 301.

In addition, if the calculated coordinates correspond to the predetermined absolute coordinate region when the pointing device 301 is being used, the pointer may be displayed at a specific point corresponding to the calculated coordinates on the display 180.

Although FIG. 6(*a*) shows that the operation region 610 defined by the pointing device 301 (e.g., an area in which the pointing device 301 may be used or operated by the user) is shaped rectangular, the scope or spirit of the present invention is not limited thereto and the pointing device 301 can operate in the directions of X, Y, and Z axes, such that the operation region 610 of the pointing device 301 may be some part of a sphere shape or other shape as shown in FIG. 6(*b*) and may be mapped to the display region 620 on the display 180.

In the meantime, since the operation region 610 is mapped to the display region 620, the coordinate calculator can calculate display coordinates on the basis of operation coordinate information or variation information of the operation coordinates.

The display coordinates may also be calculated even when being located outside of the display region 620. That is, if the display coordinates fall outside the display region 620, a virtual display region is established and associated display coordinates corresponding to the virtual display region are calculated. The display coordinates located outside of the display region 620 may be referred to herein as virtual display coordinates.

The controller 170 controls the pointer 302 to be displayed within the display region 620 using the calculated display coordinates at step S530. On the other hand, if the calculated display coordinates are located in the display region 620, the controller 170 may control the pointing device 301 to transmit operation coordinate variation information. That is, the controller 170 may control the pointing device 301 to continuously transmit operation coordinate variation information through the user input interface 150.

Meanwhile, if the calculated display coordinates are located outside of the display region 620, the controller 170 may recognize specific display coordinates having been displayed at the edge of the display region 620 from among the calculated display coordinates, and then display the pointer at the edge of the display region 620 using the recognized display coordinates.

If the calculated display coordinates are out of the display region 620, the controller 170 may control the pointing device 301 to transmit operation coordinate information. In other words, the controller 170 may control the pointing device 301 to continuously transmit the operation coordinate information through the user input interface 150.

Meanwhile, if the pointer is displayed at the edge of the display region 620 for a predetermined period of time or longer, the controller 170 may deactivate display of the pointer on the display 180. If the pointer is displayed at the edge of the display region for a predetermined period of time or longer, the controller 170 determines that the pointing device 301 is no longer used and informs the user of the determined result while removing the pointer from the display 180. Therefore, if the user desires to view either a broadcast program depending on a broadcast signal or an external image depending on an external signal, the user can view the corresponding image without the pointer being displayed on the display region 620.

On the other hand, since the operation region 610 is preferably mapped to the display region 620 on a one-to-one basis, the controller 170 can more correctly display the pointer on the display region 620 in correspondence with a motion of the pointing device, such that consistency of the pointer display can be maintained.

On the other hand, the display coordinates for displaying the pointer on the display 180 may also be calculated by the methods for calculating relative coordinates according to other embodiments of the present invention.

Figure 7:
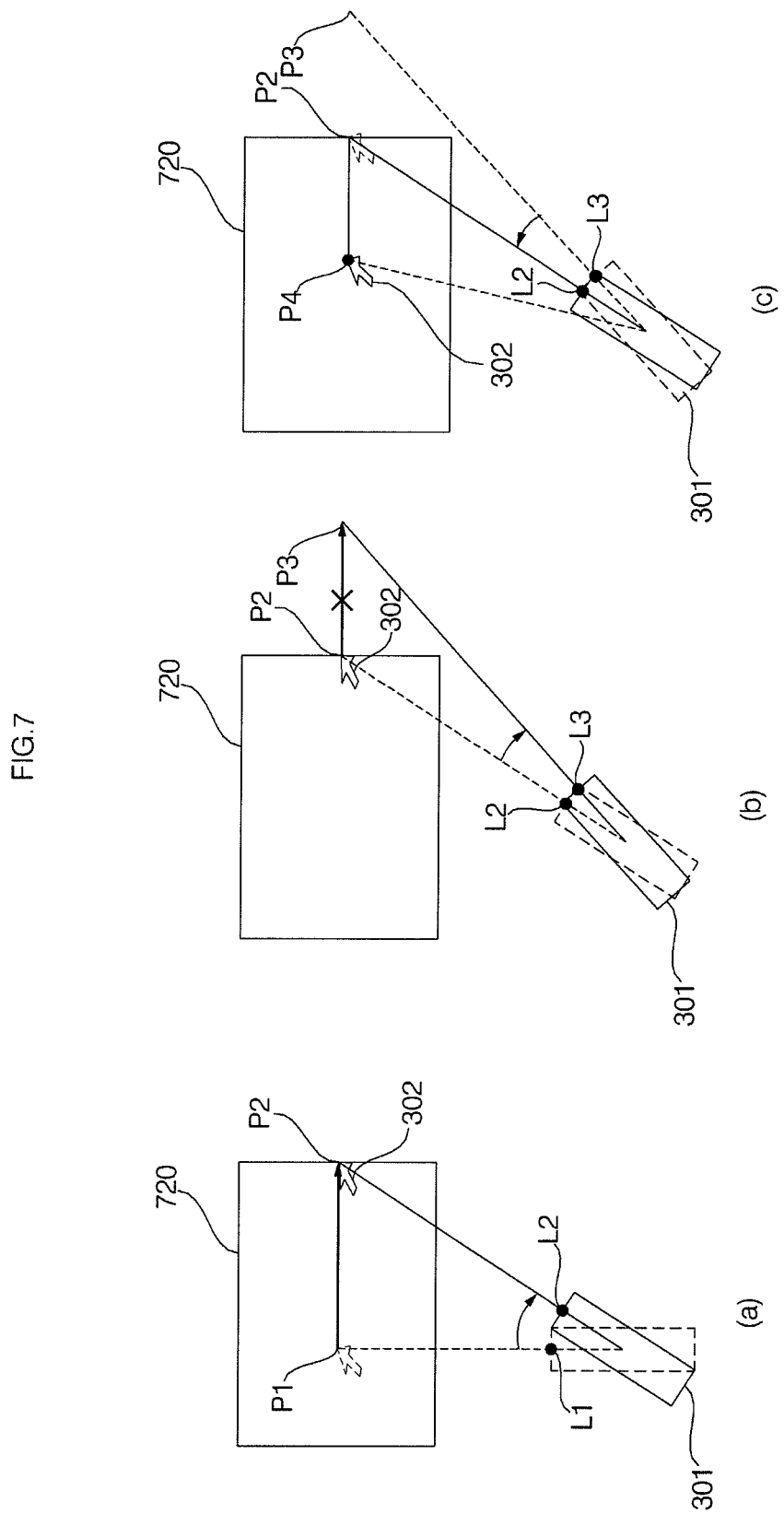

FIG. 7 illustrates that the pointer is displayed in accordance with relative display coordinates according to an embodiment of the present invention.

Referring to FIG. 7(*a*), if the pointing device 301 rotates or moves from a first point L1 to a second point L2 a display region 720 of the display 180, an operation coordinate variation (e.g., motion variation) of the pointing device 301 is added or subtracted at a first pointer position P1 of the display region 720, such that the pointer 302 moves from the first pointer position P1 to a second pointer position P2 and is then displayed at the second pointer position P2 on the display region 720.

On the other hand, according to absolute coordinates, a first point L1 and a second point L2 of the pointing device 301 may correspond to the operation coordinates of the pointing device 301 on a one-to-one basis. The first pointer position P1 and the second pointer point P2 of the edge part may correspond to display coordinates calculated by the user input interface 150.

Next, referring to FIG. 7(*b*), if the pointing device 301 rotates or moves from the second point L2 to a third point L3, an operation coordinate variation (e.g., motion variation) of the pointing device 301 is added or subtracted at the second point (L2) in such a manner that the pointer 302 is displayed.

At this time, once the pointer 302 reaches or is moved to the second pointer position P2 located at the edge of the display region 720, the pointer 302 is continuously displayed at the second pointer position P2 even though the pointing device 301 is moved further to the right.

That is, generally, in response to the motion of the pointing device 301, it can be recognized that display coordinates move from the second pointer position P2 to the third pointer position P3. In fact, if the display coordinates move out of the second pointer position P2, the display coordinates may be considered virtual display coordinates. If the display coordinates move out of the display region 720 (e.g., the pointing device is moved to the third point L3 which means the pointer 302 is supposed to moved to the third pointer position P3), the controller 170 maintains the pointer 302 at the edge of the display region 720 (at the second pointer position P2) as shown in FIG. 7(*b*) and the pointer 302 is not moved to the third pointer position P3.

Referring to FIG. 7(*c*), if the pointing device 301 rotates or moves from the third position L3 to the second position L2 in the opposite direction to the previous direction, the pointer 302 moves from the second pointer position P2 located at the edge of the display region 620 to a fourth pointer position P4 obtained when the motion degree from the third point L3 to the second point L2 is added or subtracted, such that the pointer 302 is displayed at the fourth pointer position P4. For instance, as the pointing device 301 moves from the third position L3 to the second position L2, the pointer 302 is moved from the third pointer position P3 to the fourth pointer position P4 on the display, proportional to the movement distance of the pointing device 301.

The user moves the display position of the pointer in correspondence with relative operation of the pointing device, such that the user may desire to move the pointer in accordance with the relative motion of the pointing device irrespective of a current position of the pointer. For example, if the user moves the pointing device to the left on the condition that the pointer is displayed at the edge, the user may also desire the pointer to move to the left in correspondence with the motion of the pointing device.

Therefore, if the pointer is displayed at the edge part and moves out of the edge part, the motion of the pointing device is not reflected. If the pointing device 302 rotates or moves from the third point L3 to the second point L2 in the opposite direction to the previous motion direction, the image display apparatus can move the pointer to the same direction in proportion, to rotation or motion from the third point L3 to the second point L2.

The coordinate calculation method based on such relative coordinates moves the pointer in proportion to the direction and degree of the motion of the pointing device handled by the user, and displays the moved pointer, such that it can move and display the pointer in correspondence with the direction and degree of the motion of the pointer desired by the user.

Figure 8A:
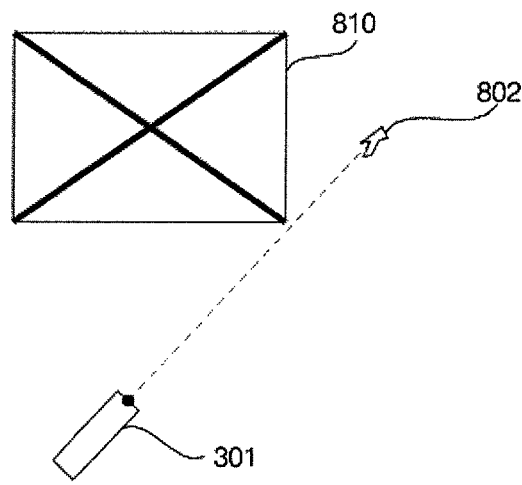

On the other hand, when using the calculation method based on absolute coordinates as shown in FIG. 8A, if the pointing device 301 greatly moves to the right or left, or if a predetermined time has elapsed while a corresponding pointer 802 moves and is then displayed so that the pointer 802 becomes deactivated, the pointer 802 may disappear from a display region 810 of the display 180.

For instance, if the user re-manipulates the pointing device 301 on the condition that the pointer is not displayed, after the initiation operation illustrated in FIG. 6 is performed, the pointer moves in response to the user input and then displayed, resulting in user inconvenience.

Figure 8B:
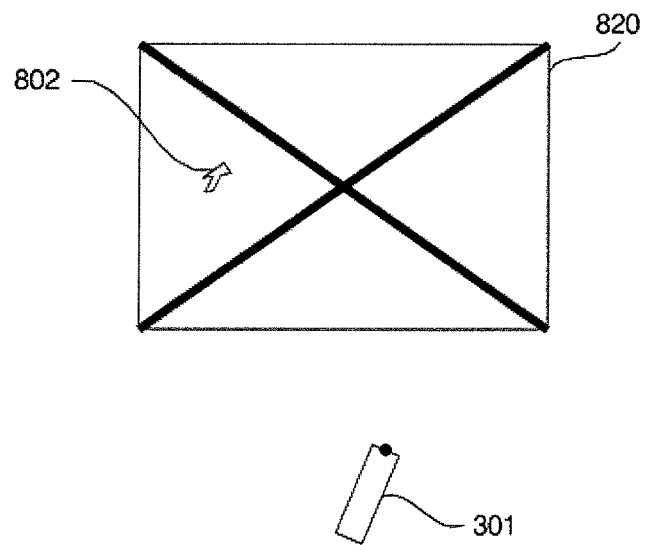

In addition, when using the calculation method based on relative coordinates, the pointer moves in response to motion of the pointing device 301 and is then displayed in such a manner that the direction of the pointing device 301 may be different from that of the pointer 802 as shown in FIG. 8B.

Therefore, a method for operating the image display apparatus according to one embodiment of the present invention can use not only the method for calculating absolute coordinates but also the method for calculating relative coordinates.

For example, if the calculated coordinates are within the absolute coordinate region, the pointer is displayed at a specific point corresponding to the calculated coordinates (step S530 of FIG. 5). That is, only when the calculated coordinates correspond to the absolute coordinate region, the method for calculating the absolute coordinates is applied to step S530, and the pointer is displayed at a specific position corresponding to the operation coordinates of the pointing device on a one to one basis.

On the other hand, if the calculated coordinates are contained in the relative coordinate region, the pointer may be displayed at the calculated coordinates on the basis of previous display position information of the pointer and operation coordinate variation of the pointing device. That is, the method for calculating relative coordinates is used only when the calculated coordinates correspond to the relative coordinate region, and the operation coordinate variation of the pointing device is added or subtracted to and from the most display coordinates of the pointer, the previous display position information or the initiation position information, such that the pointer is displayed at the resultant coordinates.

On the other hand, the method for operating the image display apparatus according to one embodiment of the present invention may further include the steps of dividing the display region of the display 180 into an absolute coordinate region and a relative coordinate region, and establishing the divided result.

If the calculated coordinates obtained when the display region is divided into the absolute coordinate region and the relative coordinate region correspond to the absolute coordinate region, the method for calculating absolute coordinates may be used. Alternatively, if the calculated coordinates correspond to the relative coordinate region, the method for calculating relative coordinates may be used.

Figure 9:
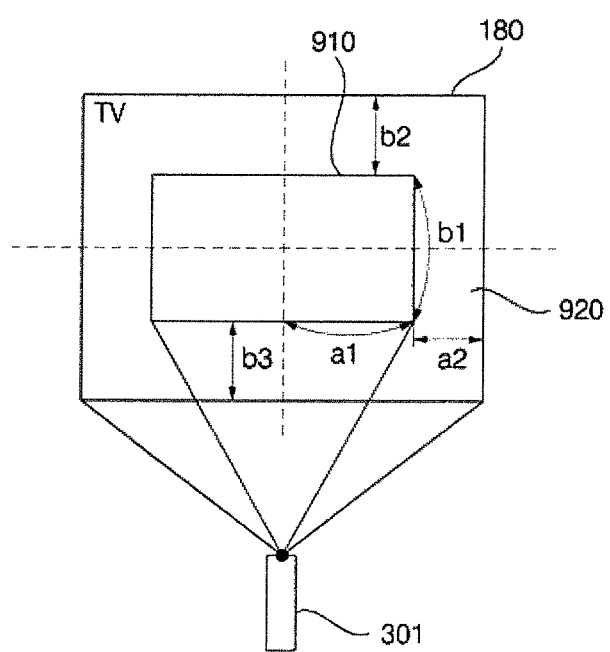

On the other hand, in accordance with an embodiment of the present invention, as shown in FIG. 9, in the aforementioned establishing step, a relative coordinate region 920 is arranged at the outside of an absolute coordinate region 910 on the display 180.

For instance, the central part of the display region is assigned the absolute coordinates, the position of the pointing device is adjusted to be identical to that of the pointer displayed on the image display apparatus, such that the pointer can be more correctly displayed.

In addition, relative coordinates are assigned to the edge part of the display region, such that the pointer can be located at the edge part even if the pointing device moves a great distance up, down, right, or left. After that, the image display apparatus moves the pointer in response to relative motion variation of the pointing device, and displays the pointer at the resultant position. As a result, the user can easily and simply manipulate the pointing device without searching for an additional initiation operation or a current pointer position.

On the other hand, the relative coordinate region is larger than the absolute coordinate region.

Referring to FIG. 9, half the horizontal length of the absolute coordinate region 910 is denoted by 'a1', the vertical length of the absolute coordinate region 910 is denoted by 'b1', and the remaining regions other than the absolute coordinate region 910 may be set to the relative coordinate region 920.

If the absolute coordinate region 920 is too large, the number of cases in which the region is determined to be the relative coordinate region is reduced, so that the user may have difficulty in detecting the pointer position. Otherwise, if the relative absolute region 920 is too large, the accuracy of pointer display may be inconsistent with the direction of the pointing device.

On the other hand, the size of the absolute coordinate region 910 and the size of the relative coordinate region 920 may be changed according to the size of the display 180 and the detected operation distance of the pointing device.

For example, if the display has a size of 47 inches, a recommended viewing distance is about 2.2 m, the ratio of 'a1' to 'a2' is about 3:2, and the ratio of 'b1' to the sum of 'b2' and 'b3' is 2:3. On the other hand, if the display has a size of 42 inches, the recommended viewing distance is about 2 m, such that the size of the absolute coordinate region can be reduced.

The signal received from the pointing device 301 may include operation coordinates of the pointing device and information about variation of the operation coordinates of the pointing device.

In accordance with an embodiment, if the image display apparatus according to the present invention does not receive the signal from the pointing device for a predetermined period of time, it may further include the step of deactivating the display status of the pointer. Accordingly, if the user does not operate the pointing device, the image display apparatus may deactivate the display state of the pointer such that the user can freely view desired images without disturbance.

On the other hand, although the arrow is exemplarily used as an example of the pointer in the present invention, the scope or spirit of the present invention is not limited thereto, and the pointer may also be denoted by a cursor, an image or an icon, etc.

In accordance with another embodiment of the present invention, the method for operating the image display apparatus includes receiving a signal from a pointing device, calculating display coordinates for displaying a pointer on the basis of the received signal, and displaying the pointer on the display according to the calculated coordinates. The calculation of the display coordinates is characterized in that different coordinate calculation methods are used on the basis of position information of the pointing device.

That is, the method for calculating absolute coordinates and the method for calculating relative coordinates may be suitably used according to position information of the pointing device even if an additional region is not established.

On the other hand, the calculation of the display coordinates may include using the method for calculating absolute coordinates when the angle is less than a predetermined angle, and using the method for calculating relative coordinates when the angle is equal to or higher than the predetermined angle.

The position information may include information about a relative distance and angle of the pointing device on the basis of the position of the display. The signal received from the pointing device may include operation coordinates of the pointing device and information about variation of the operation coordinates of the pointing device.

Figure 10:
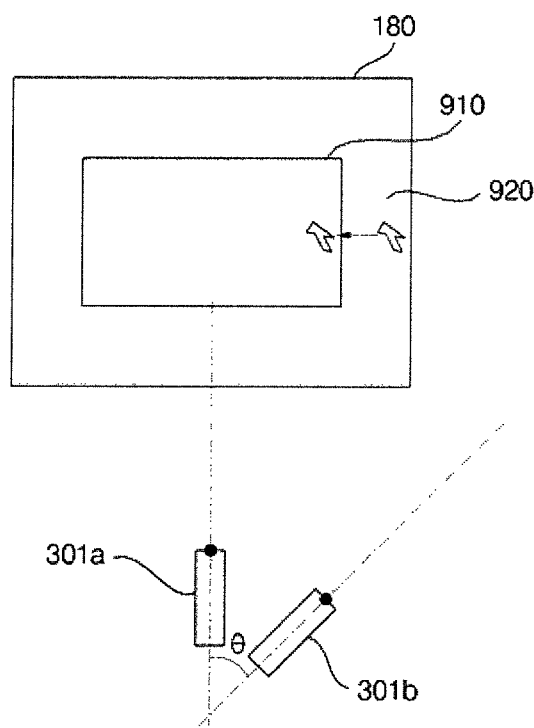

Referring to FIG. 10, if a pointing device 301a is located at an angle of less than a predetermined angle (θ) on the basis of a virtual line at the center part of the display 180, the method for calculating absolute coordinates may be used. Otherwise, if the pointing device 301a is located at an angle equal to or higher than the predetermined angle (θ) (301b), the method for calculating relative coordinates may be used.

On the other hand, the predetermined angle (θ) may be changed in response to the distance (r) between the display 180 and the pointing device. For example, the predetermined angle (θ) may be changed to be inversely proportional to the distance (r) between the display 180 and the pointing device.

In this case, the method for calculating absolute coordinates may calculate the display coordinates by mapping the operation region depending on the operation coordinates of the pointing device to the display region of the display on a one to one basis.

In addition, the method for calculating relative coordinates may calculate the display coordinates by adding or subtracting the operation coordinate variation of the pointing device to and from either the initiation position of the pointer or the current position coordinates of the pointer.

On the other hand, the method for operating the image display apparatus according to the present invention may further include receiving the position information from the pointing device, or identifying the position information by enabling any one of the sensor unit, the camera unit or the user input unit to detect the position of the pointing device.

In accordance with one embodiment, as shown in FIG. 10, if the absolute coordinate region 910 is established at the center part of a display screen and the relative coordinate region 920 is established in the vicinity of the absolute coordinate region 910, the size of the absolute coordinate region 910 and the size of the relative coordinate region 920 may be established on the basis of position information of the pointing device.

On the other hand, if the image display apparatus does not receive the signal from the pointing device for a predetermined period of time, the display state of the pointer is deactivated so that the image display apparatus does not disturb the user who views an image.

Figure 11:
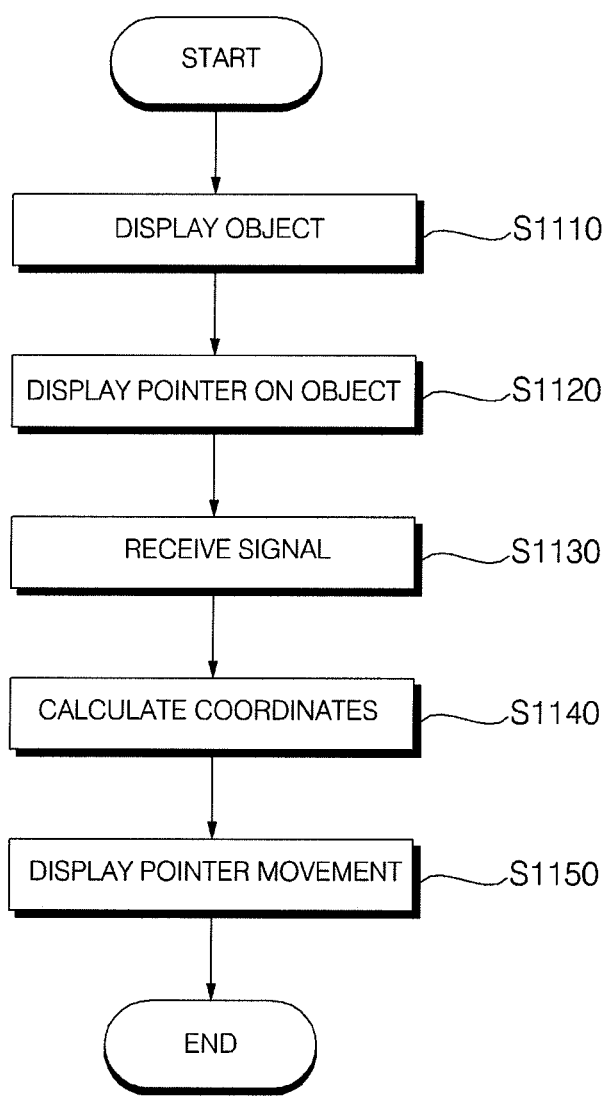
FIG. 11 is a flowchart illustrating a method for operating the image display apparatus according to one embodiment of the present invention.
Figure 12:
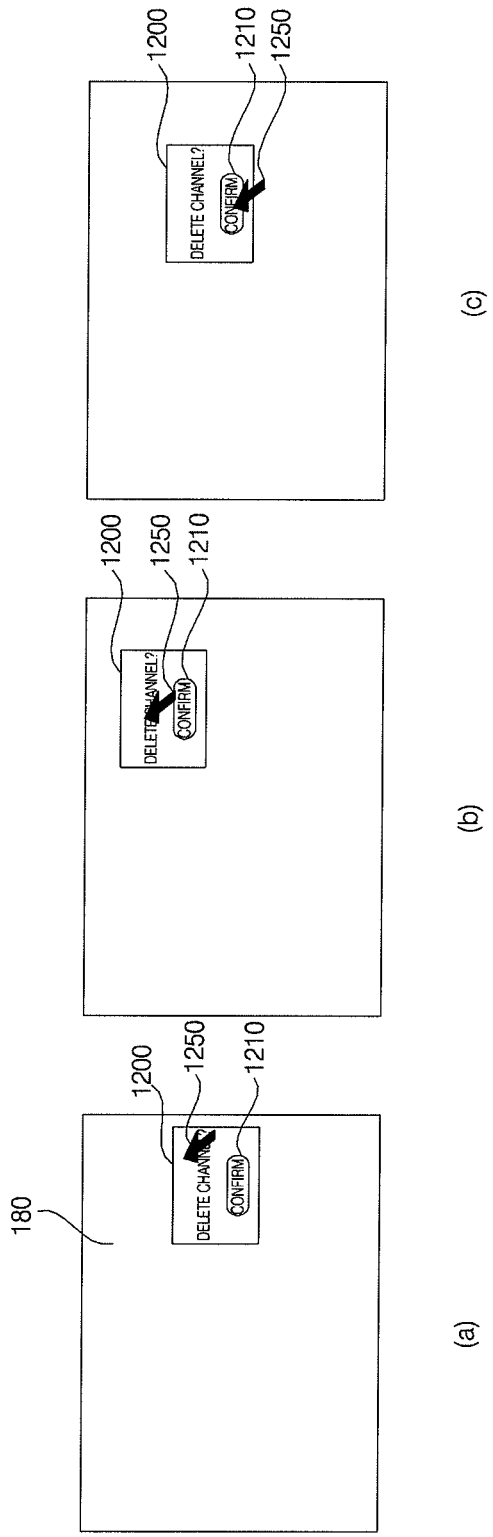

FIG. 11 is a flowchart illustrating a method for operating the image display apparatus according to one embodiment of the present invention. FIGS. 12 to 13 illustrate a variety of examples of a method for operating the image display apparatus according to one embodiment of the present invention. These methods can be implemented in the devices of FIGS. 1-4B, but can be implemented in other suitable devices.

Referring to FIG. 11, the method for operating the image display apparatus according to another embodiment of the present invention includes displaying an object on the display (S1110); displaying the pointer on the region on which the object is displayed (S1120); receiving a signal from the pointing device (S1130); calculating display coordinates for displaying the pointer using the relative coordinate calculation method on the basis of the received signal (S1140); and moving and displaying the pointer on the basis of the calculated coordinates (S1150).

In this case, the relative coordinate calculation method may calculate the display coordinates by adding or subtracting a variation of the operation coordinates of the pointing device to and from current display coordinates of the pointer. Further instead of steps S1110 and S1120, a pointer may be displayed first on the display 180 and the object may be displayed under the pointer, or the pointer and the object on the pointer may be displayed simultaneously on the display 180. Then once a selection signal (e.g., an operation command input from the user) is received from the remote controller 200 or pointing device, the controller 170 can calculate a position (e.g., coordinates) of an selectable item within or near the object displayed on the display 180 for which the selection signal is made by the user. The controller 170 then automatically moves the pointer to the calculated position over the selectable item so that the user may not need to manually move the pointer over the selectable item in order to select that item. For instance, the controller 170 may store a location of the selectable item so that the pointer can be automatically displayed on the location of the selectable as needed.

Referring to FIG. 12(a), according to the present invention, since a pointer 1250 is automatically displayed on the display 180 to overlap with an object 1200 (e.g., displaying the pointer 1250 on the object 1200) after the object 1200 has been displayed, the user can minimize the number of operations that the user has to perform in order to move the pointer 1250 to select, execute, and terminate the object.

That is, according to a related art, since a predetermined object is displayed at a specific position, the user must move the pointer to the object position in order to select, cancel, and execute the predetermined object, resulting in a greater inconvenience of use. Specifically, if the pointer is located at the edge part of the display, the user must move the pointer a relatively long distance.

However, according to one embodiment of the present invention, the object is displayed to automatically overlap with or to be under the pointer, for an easier selection which results in a greater user convenience. For instance, when the object is first displayed on the screen, the pointer is automatically and at the same time displayed over the object.

Therefore, the method for operating the image display apparatus according to one embodiment of the present invention includes displaying a pointer corresponding to an operation of the pointing device on the display; and displaying the object on the display in such a manner that the object is overlapped by the pointer. In addition, the pointer may be located automatically at the center or a designated area of the object.

On the other hand, the method for operating the image display apparatus according to one embodiment of the present invention may further include generating an event indicating the object or receiving an input signal to display the object, or may further include generating the object on the basis of the event or the input signal.

The input signal for displaying the object is a user-entered command for displaying a predetermined object. For example, the input signal for displaying the object may be any of an input of the remote controller button for displaying a menu object, an input of a local key of the image display apparatus, and an input of selecting a previously displayed item. After that, the image display apparatus may generate and display the corresponding object.

In addition, the event for displaying the object may indicate an example case in which the object is displayed even when no command is received from the user, for example, a case in which state information of the image display apparatus is displayed by either a connection of an external device or a change of channel or volume, or a case in which a reservation function is executed.

If the pointer 1250 is located at the edge of the display 180 screen, it is determined whether the distance between the pointer 1250 and the edge end of the display screen is long enough to display the object, and the method for operating the image display apparatus may move the object so as to display the entirety of the object.

If the pointer is located at a position where no problem occurs in displaying the object, it is more preferable that the pointer 1250 be automatically displayed at the center of the object 1200 as shown in FIG. 12(*b*).

In addition, the user may drag at least some regions of the object using the pointing device or the pointer being displayed in response to the movement of the pointing device, such that the user can move the object as shown in FIG. 12(*c*).

FIG. 12(*b*) exemplarily shows that the object 1200 is for confirming whether or not a channel (e.g., delete a channel from a favorite program channel list, etc.) is to be deleted. In FIG. 12(*b*), the region to which the user can input the command is denoted by one button (i.e., a 'Confirm' button in a region 1210). However, if two commands (e.g., CONFIRM and CANCEL commands) may be selected according to object categories, or if there are a plurality of buttons or input windows capable of being selected from among the list by the user, the buttons or input windows can be selected by the user using the remote controller 200 or other input unit according to the user's convenience, such that the pointer 1250 may be displayed at the center part of the object 1200 so as to minimize the distance to each region. For instance, the controller 170 may store the location of the region 1210 and the object 1200 on the display 180 so that subsequently the pointer can be automatically moved and display over a designated point (e.g., center, middle area, other set area, etc.) on the object 1200 or the region 1210 as needed. Accordingly, the In addition, the object may receive a command as an input, or may indicate information associated with the image display apparatus. As shown in FIG. 12(*c*), the pointer 1250 may be displayed to overlap with the region 1210 (capable of receiving the command) contained in the object 1200.

Specifically, if the object is an OSD object configured in the form of a popup window that indicates information about the state of the image display apparatus, a region or button by which the user can input the CONFIRMATION or CLOSE command must be selected. In this case, provided that only one command can be selected, if the pointer 1250 is displayed to overlap with the region 1210 capable of receiving the command from among the object 1200, it is not necessary to additionally move the pointer according to the present invention, resulting in a greater convenience. Therefore, the above-mentioned operation can be carried out through a single selection command, and the number of user operations can be minimized.

FIG. 13 shows an example in which the pointer is first displayed and the object is then displayed on the display 180.

Referring to FIG. 13(*a*), a pointer 1350 corresponding to an operation of the pointing device 200 is first displayed on the display 180 without any object. Thereafter, as shown in FIG. 13(*b*), in the case where an object 1300 is to be displayed on the display 1300 while the pointer 1350 is displayed on the display, the controller 170 may move automatically the pointer 1350 to overlap with the object 1300 as shown in FIG. 13(*c*), and then display it. Here the pointer 1350 may be moved instantaneously.

As described above, the above-mentioned embodiment may move the pointer automatically (e.g., by the controller) to either the center part of the object or a middle area of the object or a specific region (to which the user can input the command) of the object, such that the number of additional movements of the pointer that are to be manually made by the user can be minimized.

In addition, the method for operating the image display apparatus according to the above-mentioned embodiment may further include generating an event for displaying an object or receiving an input for displaying the object, or may further include generating the object on the basis of the event or the input. The user may drag at least some regions of the object using the pointing device or the pointer being displayed in response to the movement of the pointing device, such that the user can move the object.

Figure 14A:
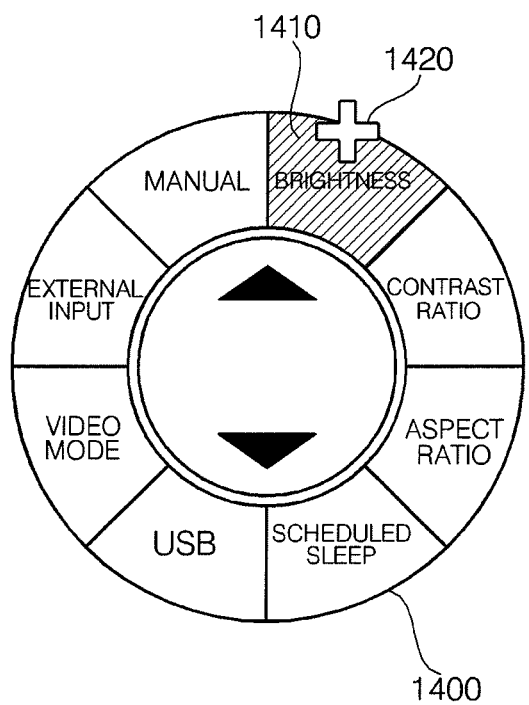
Figure 14B:
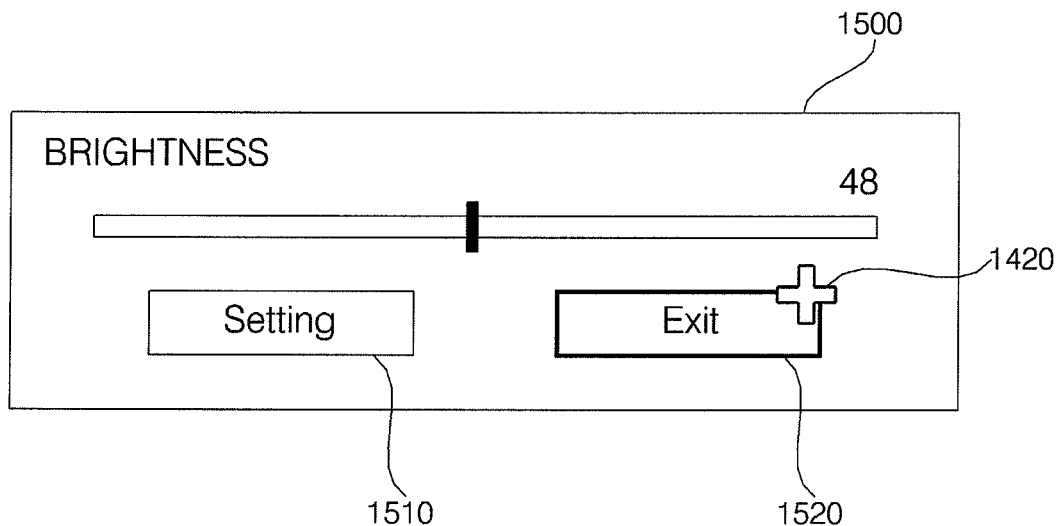
Figure 14C:
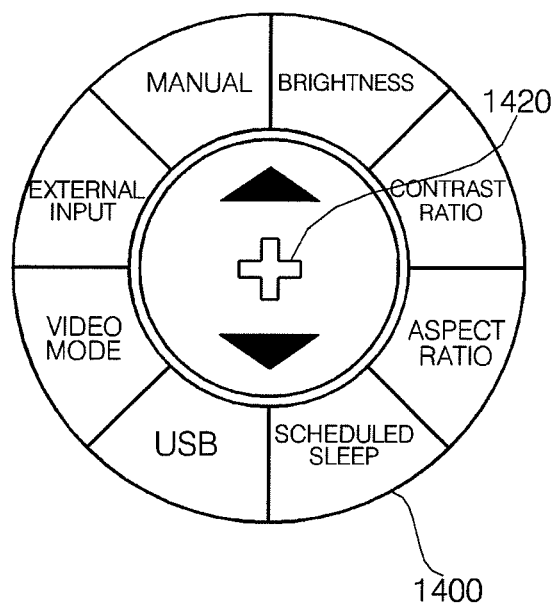

FIGS. 14A to 14C show a variety of examples illustrating the method for operating the image display apparatus according to one embodiment of the present invention.

Referring to FIG. 14A, an upper menu 1400 including a plurality of items is displayed on the display 180. The upper menu 1400 may also be denoted by a circular object as shown in FIG. 14A if desired. For example, the user may select any one of several items contained in the upper menu 1400 using a pointer 1420 displayed on the display 180 in response to the movement of the remote controller 200 such as the pointing device.

Upon receipt of an input signal for selecting one of the menu items of the upper menu 1400, the controller 170 controls the image display apparatus 100 to display a lower menu 1500 corresponding to the selected item 1410 (for Brightness) as shown in FIG. 14B.

On the other hand, while the lower menu 1500 is being displayed on the display 180, the upper menu 1400 may be displayed on the same display 180 in the form of a popup window. Alternatively, the controller 170 may control the image display apparatus to convert a display screen including the upper menu 1400 into another display screen including the lower menu 1500. So the upper and lower menus may be displayed simultaneously on the same screen of the display 180 or on different screens/sub-screens/pop-ups of the display 180. Here the user may control the lower menu 1500 using the cursor 1420 via the remote controller 200.

Thereafter, if the displaying and use of the lower menu 1500 is completed, the pointer 1420 is then automatically moved from the lower menu 1500 to the upper menu 1400 and displayed at the upper menu 1400 and preferably at the center part thereof, as shown in FIG. 14C. As a result, the user can minimize the moving distance required to select any one of several items.

Here, at the lower menu 1500 of FIG. 14B, if an EXIT item 1520 is selected, the displaying of the lower menu 1500 may be stopped. However, according to attributes of such menu items, the display status of the lower menu 1500 as well as the EXIT item may be completed. For example, according to a certain embodiment of the present invention, if a SETTING item 1510 is selected so that the setup process is completed, display of the lower menu 1500 may be completed.

For example, FIG. 14B shows that display of the lower menu 1500 is completed. The concept of FIG. 14B is not limited only to titles of items, and can also be applied to a menu having a variety of formats and attributes. Further, as shown in FIG. 14C, the controller 170 stores a location of the pointer 1420 in association with a location of a main menu such as the upper menu 1400, or vice versa. Thus when the user is finished with a sub menu such as the lower menu 1500 or the menu returns to the main menu, the controller 170 is able to automatically display the pointer at the stored location of the main menu (e.g., at a center location or on a designated location of the main menu) so that the user does not need to manually move the pointer on the display. Here, the main menu is merely an example of a predetermined menu.

In addition, the method for operating the image display apparatus may further include generating an event for displaying the upper menu (e.g., displaying a menu which is initiated by the image display apparatus) or receiving a user input for displaying the upper menu (e.g., displaying a menu which is requested by the user), or may further include generating the upper menu on the basis of the event or the input. In addition, the user may drag at least some regions of the object (the upper menu 1400 or the lower menu 1500) using the pointing device or the pointer being displayed in response to the movement of the pointing device, such that the user can move the object.

FIGS. 15A-15D show a variety of examples illustrating the method for operating the image display apparatus according to one embodiment of the present invention.

Figure 15A:
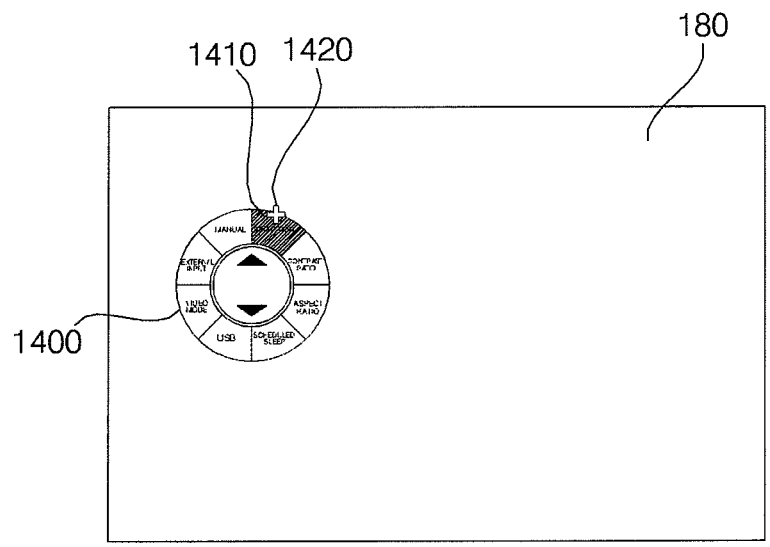

Referring to FIG. 15A, an upper menu 1400 including a plurality of items is displayed on the display 180, and the user may select one (1410) of several items contained in the upper menu 1400 using the pointer 1420 displayed in response to the movement of the remote controller such as the pointing device.

Figure 15B:
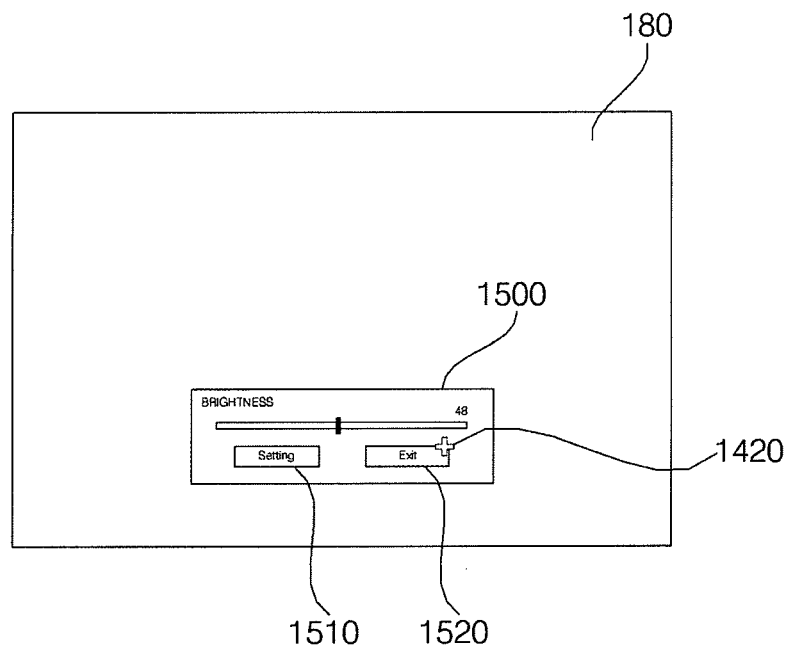

In response to an input signal for selecting the menu item 1410, a lower menu 1500 corresponding to the selected item 1410 is then displayed on the display 180 as shown in FIG. 15B.

The controller 170 may control the image display apparatus 100 to convert the display screen including the upper menu 1400 into another display screen including the lower menu 1500 as shown in FIG. 15B. As a variation, while the lower menu 1500 is displayed on the display 180, the upper menu 1400 as displayed is maintained on the same display.

Figure 15C:
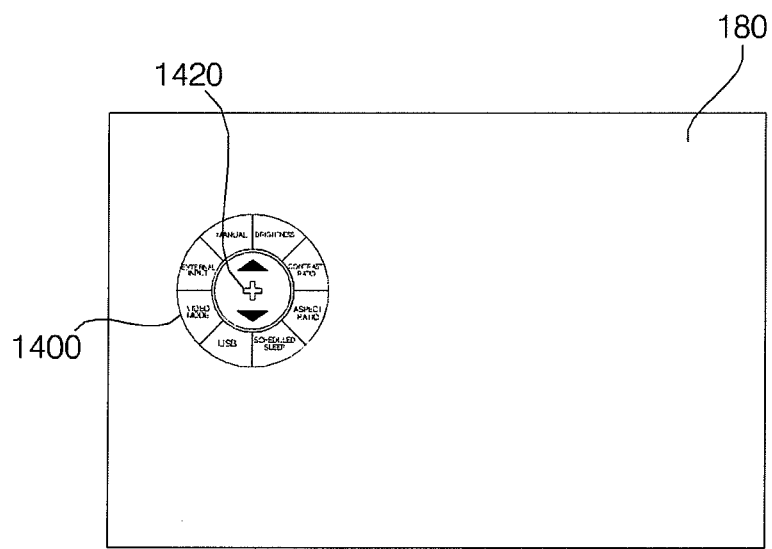

Thereafter, when an input for exiting the lower menu 1500 is received in FIG. 15B, the user exits out of the lower menu 1500 and the display 180 automatically displays the upper menu 1400 with the pointer 1420 thereon as shown in FIG. 15C. The pointer 1420 may be displayed at the center part of the upper menu 1400 as shown or can be displayed at a designated location on the upper menu 1400.

That is, in accordance with one embodiment, as shown in FIG. 15C, the upper menu 1400 may be re-displayed on the display 180, and the pointer 1420 is moved and displayed on the re-displayed the upper menu 1400 automatically when the upper menu 1400 returns. As such, there is no need for the user to manually move the pointer 1420 to use the upper menu 1400.

Figure 15D:
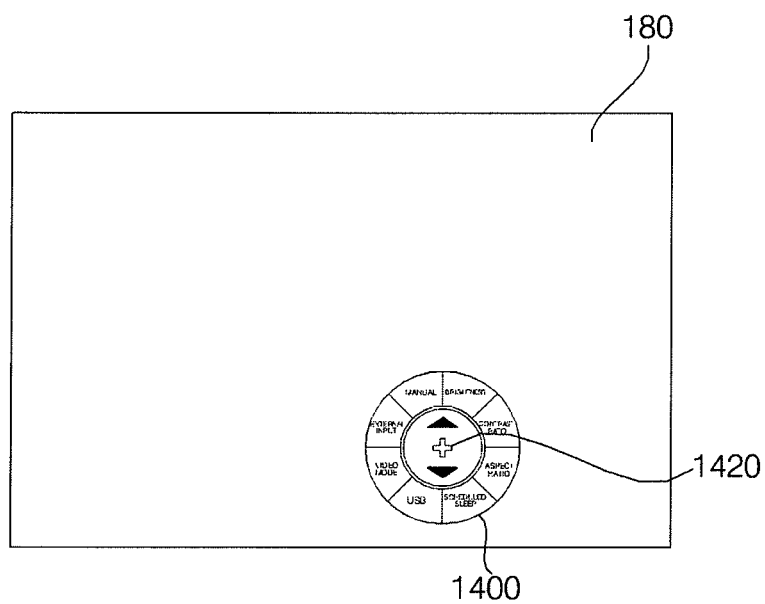

In accordance with another example, as shown in FIG. 15D, the upper menu 1400 may be displayed under the pointer 1420 at a predetermined location on the display (180) screen. For instance, when the user exits out of the lower menu 1500 in FIG. 15B, the controller 170 may automatically display the upper menu 1400 at a previously displayed location (FIG. 15C) on the display 180 or at a predesignated location on the display 180 (FIG. 15D). In either case, the pointer 1420 is automatically located over a certain area (e.g., center, middle, etc.) of the upper menu 1400 as shown in FIGS. 15C and 15D. Further, if the user enters a predetermined input to move the upper menu 1400 on the display 180 using the remote controller 200, the upper menu 1400 may be moved on the display 180 according to this input while the pointer 1420 stays at the certain area of the upper menu as the upper menu 1400 is moved.

In accordance with another example, the controller 170 may check priority information of a plurality of objects and control the display 180 to move the pointer to one of the objects or maintain the pointer on the original location on the display, based on the checking result. This example is shown in FIGS. 16A-16C to be discussed below.

The priority information may be stored in the image display apparatus 100 or received from external devices or broadcasting stations.

The priority may be determined based on the object's properties or the object's depth or frequency in use of the object or an updated time of the object.

Figure 16A:
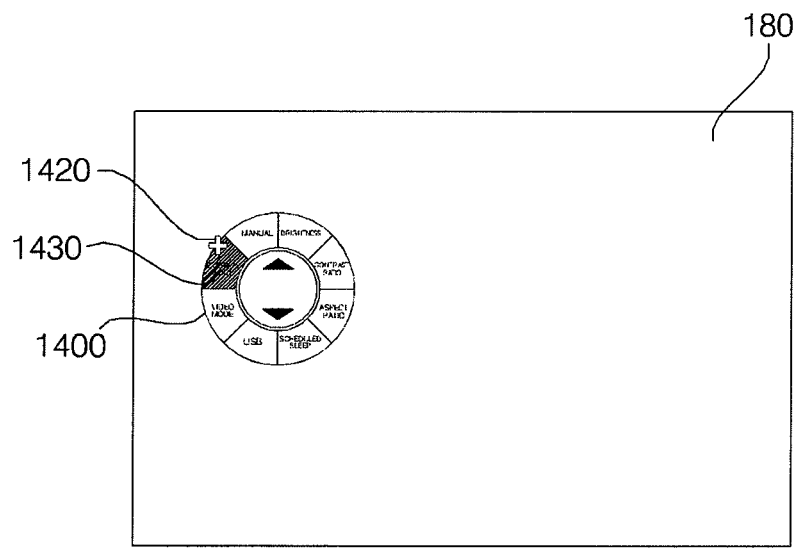
Figure 16B:
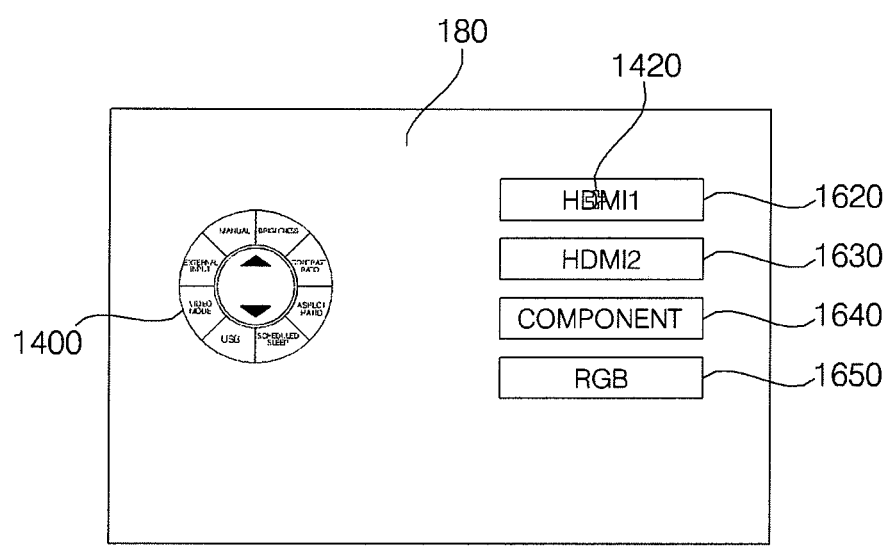
Figure 16C:
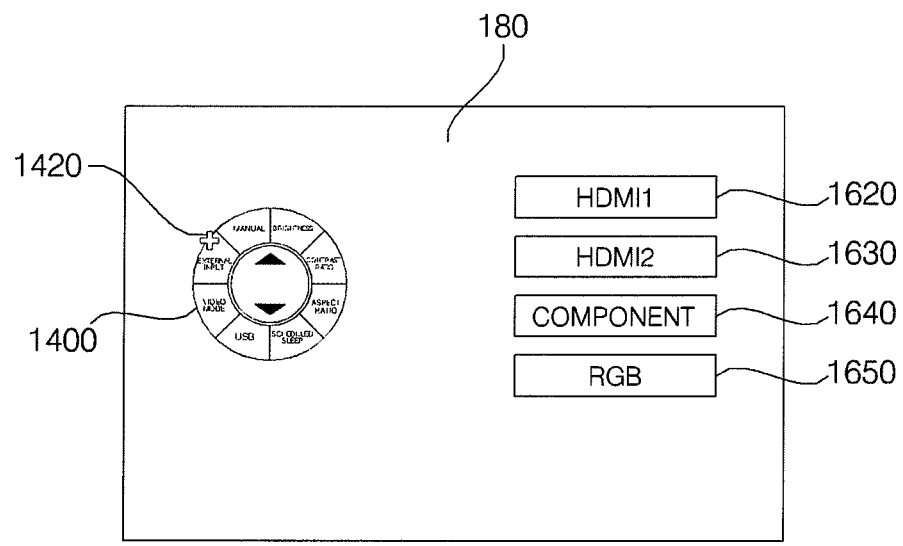

Specifically, FIGS. 16A to 16C show a variety of examples illustrating the method for operating the image display apparatus according to one embodiment of the present invention.

Referring to FIG. 16A, an upper menu 1400 including a plurality of selectable items is displayed on the display 180.

When an 'external input' item 1430 among the items contained in the upper menu 1400 is selected by the user (e.g., using the remote controller 200), the controller 170 can display a plurality of objects 1620, 1630, 1640, 1650 associated with the selected 'external input' item 1430 on the display 180. The controller 170 also checks the priority information of the objects 1400, 1620, 1630, 1640, 1650 displayed on the display 180. As mentioned above, such priority information may be stored in the apparatus 100 or may be received from an external source such as another device, server, station, etc. The controller 170 then determines which has the highest priority among all the displayed objects and automatically moves the pointer over the determined object.

For instance, if the 'HDMI 1' item 1620 has been determined to have the highest priority among the plurality of objects 1400, 1620, 1630, 1640, 1650 (e.g., based on the frequency of use of each object), the pointer 1420 may move over the 'HDMI 1' item 1620 so that the pointer 1420 is automatically displayed on the item 1620 as shown in FIG. 16B. In another example if the upper menu object 1400 has been determined to have the highest priority among the plurality of objects 1400, 1620, 1630, 1640, 1650, the pointer 1420 may be maintained on the original location as shown in FIG. 16C and be displayed over the upper menu object 1400.

The concept of the present invention is not limited only to types of objects, and can also be applied to objects having a variety of formats and attributes.

Figure 17:
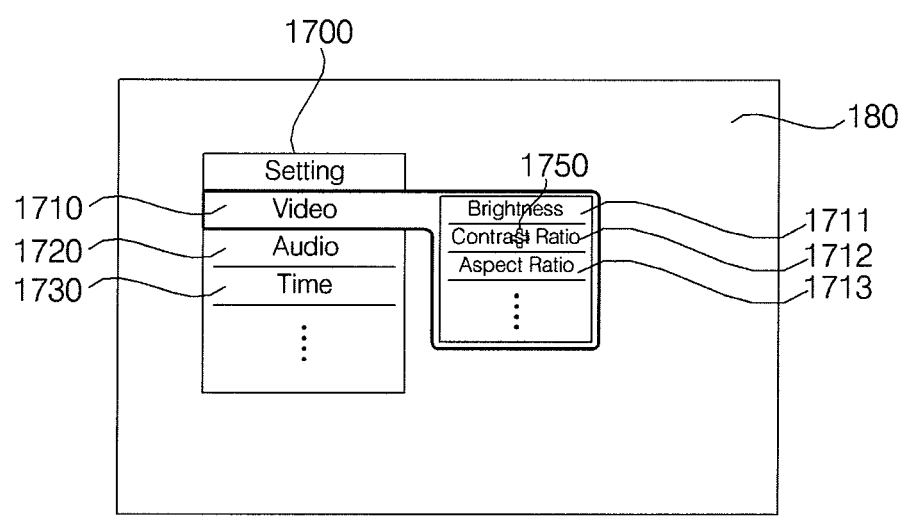
Figure 18:
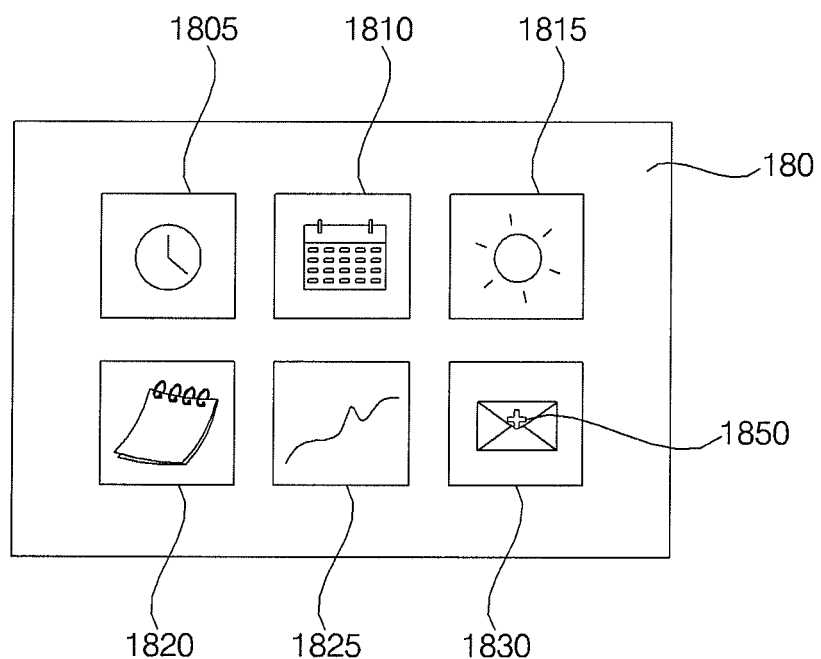

FIG. 17 and FIG. 18 show a variety of examples illustrating the method for operating the image display apparatus according to one embodiment of the present invention.

For example, the image display apparatus 100 may display a setting window 1700 on the display 180 in order to allow setting of the properties of the image display apparatus 100.

The setting window 1700 may have a hierarchical structure. First-depth items may include a video setting item 1710, an audio setting item 1720, a time setting item 1730, etc.

When the user selects the video setting item 1710, second-depth items (e.g., a brightness item 1711, a contrast ratio 1712, an aspect ratio 1713, etc.) associated with the selected video setting item 1710 are displayed on the display 180 as shown in FIG. 17.

In this case, the controller 170 may check the priority information of these items and control the display 180 to move the pointer to one of the items or maintain the pointer on the original location, based on the checking result (based on the priority of the items).

In another example of FIG. 18, a time widget 1805, a date widget 1810, a whether widget 1815, a memo widget 1820, a stock widget 1825, and an e-mail widget 1830 are displayed together with a pointer 1850 on the display 180.

If the e-mail widget 1830 has the highest priority among the plurality of widgets 1805, 1810, 1815, 1820, 1825, 1830, the controller 170 automatically displays the pointer 1850 over the e-mail widget 1830 as shown in FIG. 18. Here, the pointer 1850 may be displayed at a preset location of the e-mail widget 1830.

The embodiments of the present invention can display the object and the pointer on the object, or move the pointer to a region where the object is displayed and display the pointer on the region, so that the pointer can be located over the object. Therefore, the user can more quickly and easily select or execute a desired object, such that the operation time of the user and the number of user operations are reduced, resulting in a greater convenience.

On the other hand, if the object is displayed to overlap with the pointer, the relative coordinate calculation method can be applied to the next pointer movement. The user can intuitively recognize the pointer displayed on the object, such that the user can enter a desired command by moving the pointer in proportion to the movement of the pointing device.

In addition, if the object is displayed to overlap with the pointer, the embodiments of the present invention can move the pointer within the object display region. For instance, the edge of the object region is set to a boundary (or limit) where the pointer can be displayed on the object. Thus, although the user moves the pointing device by an excessively long distance, the pointer does not escape the object and remains on the object displayed on the display, helping the user to conduct a variety of selection or input actions.

As is apparent from the above description of the embodiments of the present invention, an image display apparatus and a method for operating the same according to the present invention can correctly and consistently display a pointer, and can continuously display a pointer without an additional initiation or correction operation or a user's manual manipulation.

Therefore, the user can easily use the remote controller without using additional operations, resulting in an increase in user convenience.

In addition, since a method for calculating relative coordinates is applied to an object, the user can enter a desired command or data using a minimum number of input operations, resulting in an increase in user convenience.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The methods for operating an image display apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the embodiments of the present invention have been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method for operating an image display apparatus, the method comprising:
   displaying, on a display of the image display apparatus, a pointer corresponding to an operation of a pointing device;
   generating an event for displaying an object or receiving an input signal for displaying the object;
   determining locations of the pointer and the object according to a number of items included in the object;
   displaying the object to overlap with the pointer on the display based on the determined locations of the pointer and the object;
   checking priority information corresponding to a plurality of objects to obtain a checking result;
   controlling the display to move the pointer to one of the plurality of objects based on the checking result being a first predetermined checking result; and
   controlling the display to maintain the pointer on an original location on the display based on the checking result being a second predetermined checking result,
   wherein, when the object includes only one item capable of being selected, the pointer is displayed to overlap with either a region of the object capable of receiving a command or an item of the object capable of being selected, and when the object includes at least two items capable of being selected, the pointer is displayed at a center of the object.

2. The method according to claim 1, further comprising: generating the object based on the event or the input signal.

3. The method according to claim 1, further comprising: moving the object by dragging at least one region of the object.

4. The method according to claim 1, wherein the displaying of the pointer and the displaying of the object occur simultaneously without having to move the pointer on the display.

5. An image display apparatus comprising:
   a display; and
   a controller configured to:
   display, on the display, a pointer corresponding to an operation of a pointing device, when an event for displaying an object or an input signal for displaying the object is received, generate the object based on the event or the input signal, determine locations of the pointer and the object according to a number of items included the object, display the object to overlap with the pointer on the display based on the determined locations of the pointer and the object, check priority information corresponding to a plurality of objects to obtain a checking result, control the display to move the pointer to one of the plurality of objects based on the checking result being a first predetermined checking result, and control the display to maintain the pointer on an original location on the display based on the checking result being a second predetermined checking result, wherein, when the object includes only one item capable of being selected, the pointer is displayed to overlap with either a region of the object capable of receiving a command or an item of the object capable of being selected, and when the object includes at least two items capable of being selected, the pointer is displayed at a center of the object.

6. The image display apparatus according to claim 5, wherein the controller is further configured to move the object by dragging at least one region of the object.

7. The image display apparatus according to claim 5, wherein the displaying of the pointer and the displaying of the object occur simultaneously without having to move the pointer on the display.

8. The method according to claim 1, wherein the region or the item corresponds to a CONFIRMATION command.

9. The image display apparatus according to claim 5, wherein the region or the item corresponds to a CONFIRMATION command.

* * * * *